(12) United States Patent
Tomita et al.

(10) Patent No.: US 11,301,466 B2
(45) Date of Patent: Apr. 12, 2022

(54) COMPUTER-READABLE RECORDING MEDIUM RECORDING OUTPUT CONTROL PROGRAM, OUTPUT CONTROL METHOD, AND INFORMATION PROCESSING APPARATUS

(71) Applicant: FUJITSU LIMITED, Kawasaki (JP)

(72) Inventors: Yu Tomita, Fujisawa (JP); Masahiro Koya, Machida (JP); Taki Kono, Kodaira (JP); Hiroyuki Kashiwagi, Kure (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/901,472

(22) Filed: Jun. 15, 2020

(65) Prior Publication Data

US 2020/0311073 A1 Oct. 1, 2020

Related U.S. Application Data

(63) Continuation of application No. PCT/JP2018/000771, filed on Jan. 15, 2018.

(51) Int. Cl.
*G06F 16/2452* (2019.01)
*G06F 16/2458* (2019.01)

(52) U.S. Cl.
CPC .... *G06F 16/24522* (2019.01); *G06F 16/2462* (2019.01)

(58) Field of Classification Search
CPC ........... G06F 16/24522; G06F 16/2462; G06F 16/3329; G06F 16/9535
See application file for complete search history.

(56) References Cited

U.S. PATENT DOCUMENTS

| | | | | |
|---|---|---|---|---|
| 2007/0150279 | A1* | 6/2007 | Gandhi | G10L 13/08 704/258 |
| 2015/0347900 | A1* | 12/2015 | Bell | G06N 5/02 706/11 |
| 2016/0019299 | A1* | 1/2016 | Boloor | G06F 16/36 705/3 |
| 2017/0169101 | A1* | 6/2017 | Walia | G06F 16/3344 |

(Continued)

FOREIGN PATENT DOCUMENTS

| | | |
|---|---|---|
| JP | 2004-171479 A | 6/2004 |
| JP | 2005-202627 A | 7/2005 |
| JP | 2013-005057 A | 1/2013 |

(Continued)

OTHER PUBLICATIONS

SuperAgent: A Customer Service Chatbot for E-commerce Websites, pp. 97-102 (Year: 2017).*

(Continued)

*Primary Examiner* — Albert M Phillips, III
(74) *Attorney, Agent, or Firm* — Fujitsu Patent Center

(57) ABSTRACT

A non-transitory computer-readable recording medium records an output control program for causing a computer to execute processing of: in a case where input of a question is accepted, extracting an accuracy of each of one or a plurality of answers to the question, the accuracy being stored in a storage unit; and selecting an answer to be output from the one or plurality of answers so that a total value of the accuracy of the one or plurality of answers to the question is equal to or larger than a first threshold.

6 Claims, 35 Drawing Sheets

(56) References Cited

U.S. PATENT DOCUMENTS

2017/0235895 A1* 8/2017 Cox .................. G06F 40/30
 705/2
2018/0131645 A1* 5/2018 Magliozzi ............ G06F 40/30

FOREIGN PATENT DOCUMENTS

JP 2015-036945 A 2/2015
WO 2016/104736 A1 6/2016

OTHER PUBLICATIONS

A Chatbot Using LSTM-based Multi-Layer Embedding for Elderly Care, pp. 70-74 (Year: 2017).*
An Ergonomics Evaluation to Chatbot Equipped with Knowledge-Rich Mind, pp. 95-99 (Year: 2015).*
Makoto Itoigawa et al. "Extraction of Multiple Answers on the List Type QA", FIT2004 (The Third Information Science and Technology Forum), vol. 2, pp. 219-221 (No. 2005-10025-092) Aug. 20, 2004 (Total 3 pages) (Cited in ISR).
International Search Report and Written Opinion of the International Searching Authority (Form PCT/ISA/210 and 237), mailed in connection with PCT/JP2018/000771 and dated Apr. 3, 2018 (7 pages).
Anonymous: "Chatbot", Dec. 21, 2017 (Dec. 21, 2017),pp. 1-8, XP055731934, Retrieved from the Internet: URL:https://en.wikipedia.org/w/index.php?title=Chatbot&oldid=816531650 [retrieved on Sep. 18, 2020] Cited in EESR dated Sep. 28, 2020 for corresponding European Patent Application No. 18899983.3.
EESR—Extended European Search Report dated Sep. 28, 2020 for European Patent Application No. 18899983.3.
JPOA—Office Action of Japanese Patent Application No. 2019-564258 dated Aug. 10, 2021, with Machine Translation. ** All references cited in the JPOA were previously submitted in the IDS filed on Jun. 15, 2020.
EPOA—Office Action of European Patent Application No. 18899983.3 dated Jun. 15, 2021. ** Non-patent literature cited in the EPOA was previously submitted in the IDS filed on Oct. 23, 2020.

* cited by examiner

FIG. 6
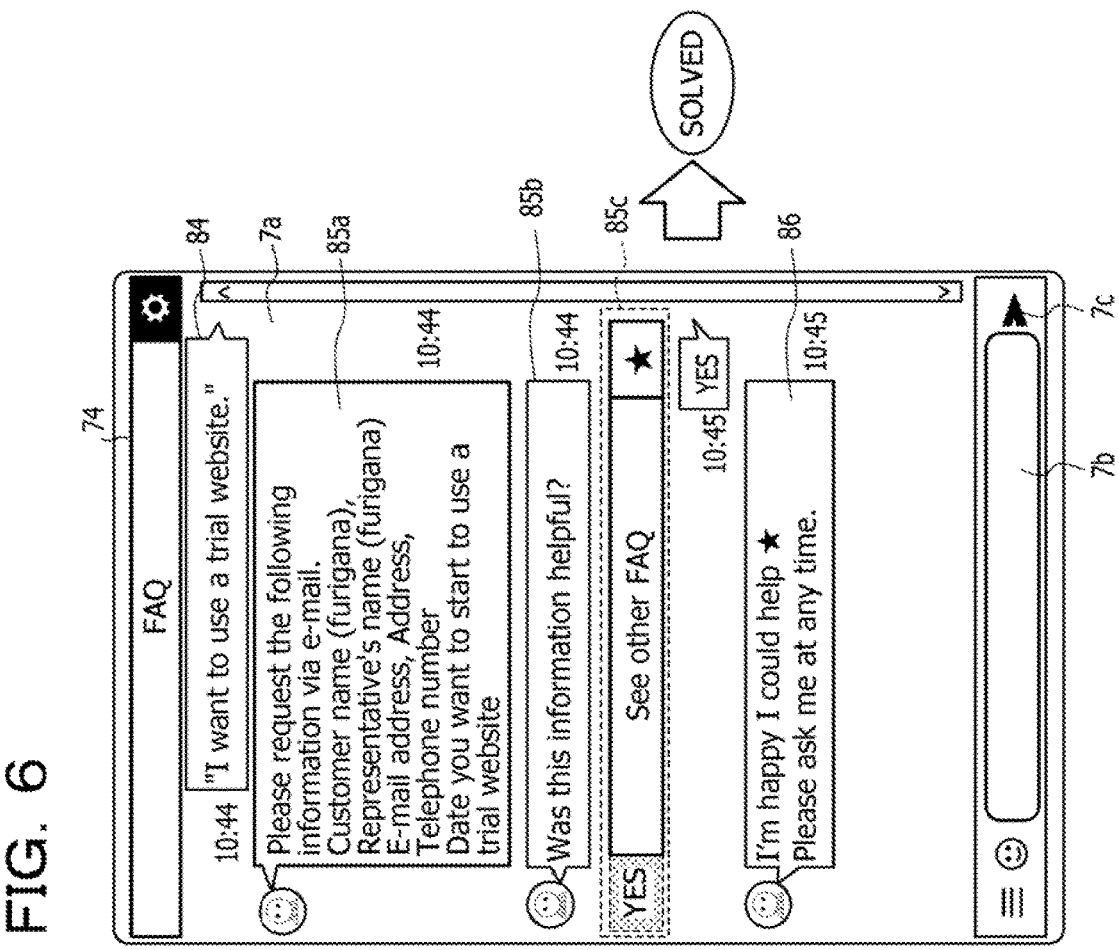
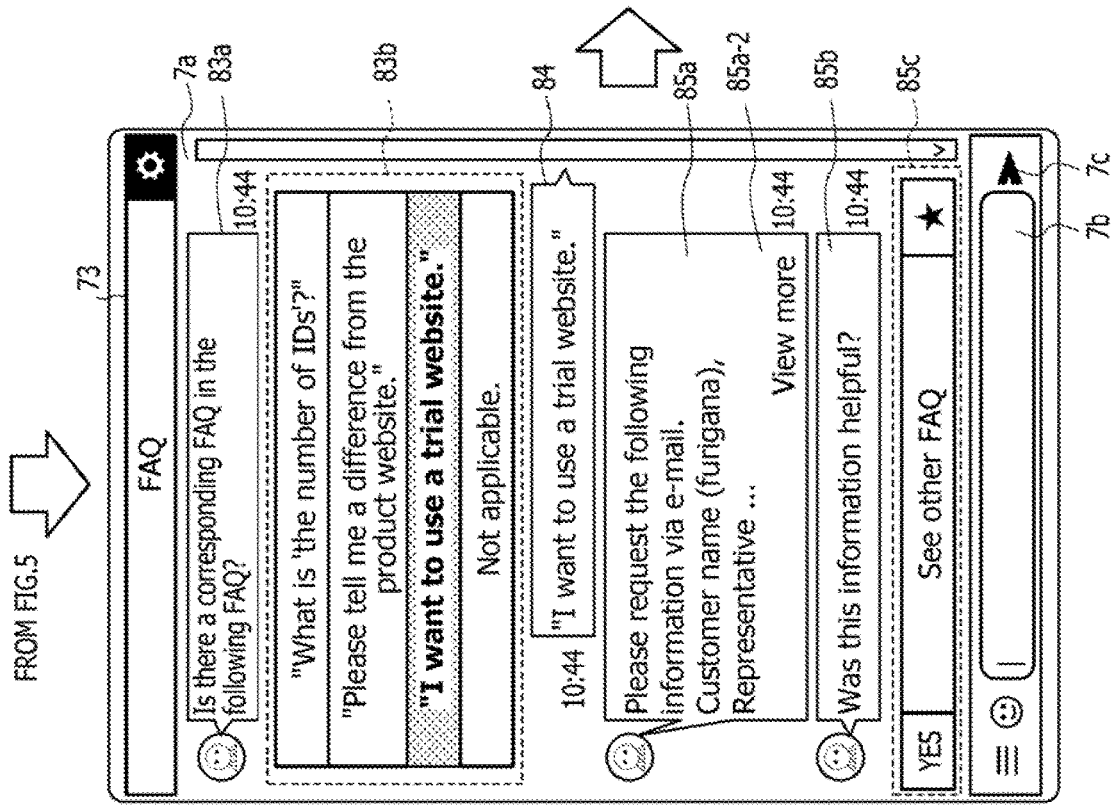

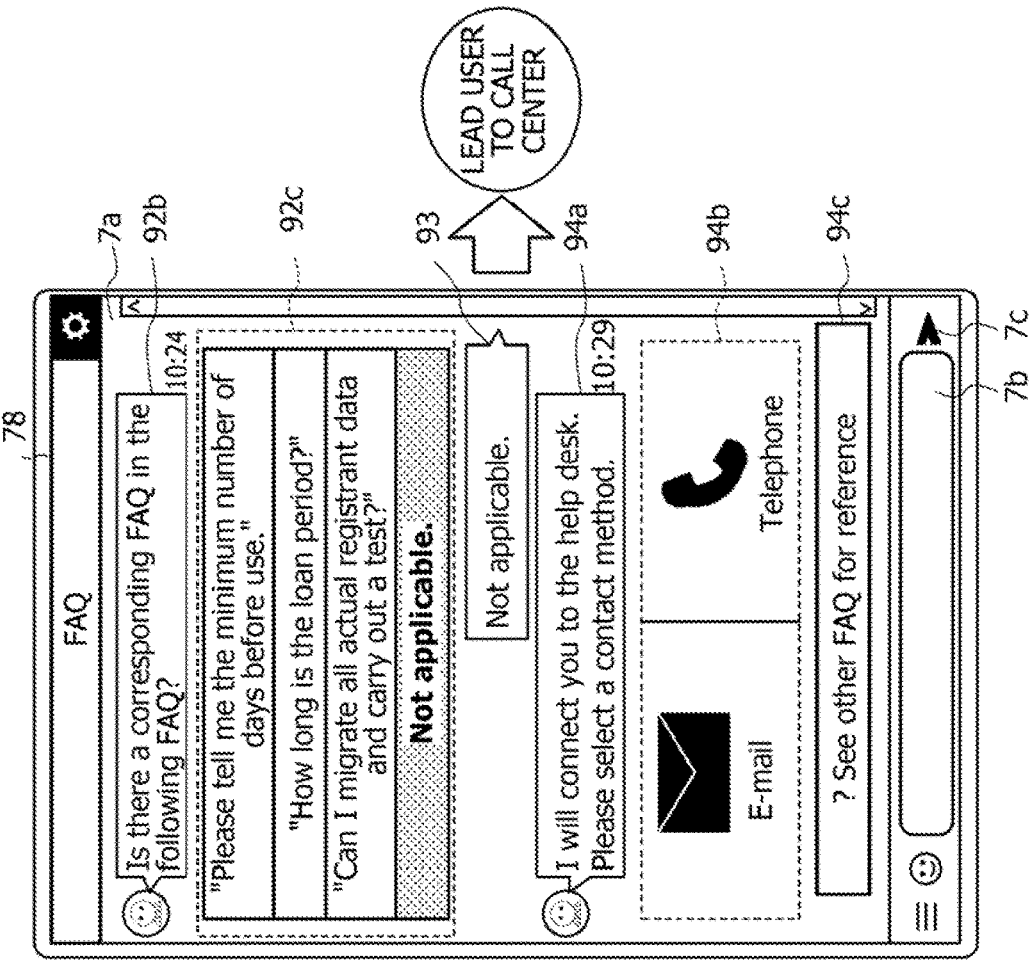
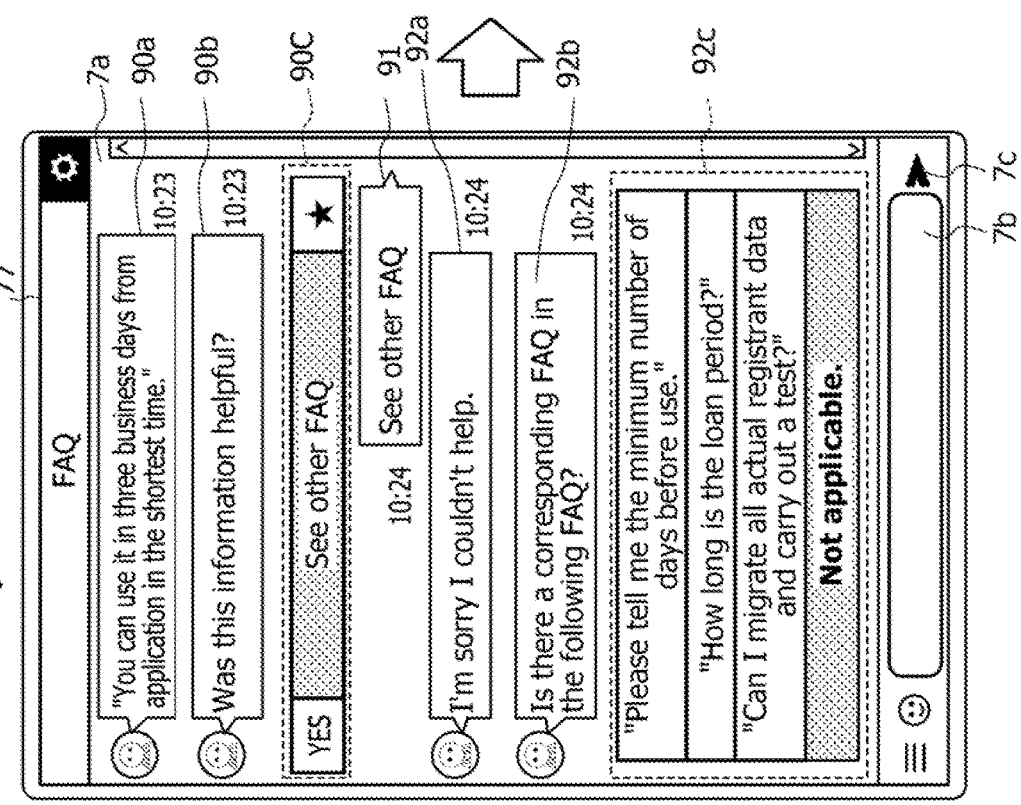
FIG. 9

FIG. 10A

| ANSWER RANK | ACCURACY (SCORE) | EQUAL TO OR LARGER THAN SINGLE APPLICATION THRESHOLD OR HIGH-ACCURACY THRESHOLD |
|---|---|---|
| 1 | 0.95 | FIRST RESPONSE |
| 2 | 0.65 | SECOND RESPONSE |
| 3 | 0.55 | |
| 4 | 0.50 | THIRD RESPONSE |
| 5 | 0.40 | |
| 6 | 0.35 | |
| 7 | 0.30 | |

FIG. 10B

| ANSWER RANK | ACCURACY (SCORE) | EQUAL TO OR LARGER THAN SINGLE APPLICATION THRESHOLD OR HIGH-ACCURACY THRESHOLD |
|---|---|---|
| 1 | 0.40 | FIRST RESPONSE |
| 2 | 0.35 | |
| 3 | 0.30 | |
| 4 | 0.25 | SECOND RESPONSE |
| 5 | 0.20 | |
| 6 | 0.15 | |
| 7 | 0.10 | |

FIG. 10C

| ANSWER RANK | ACCURACY (SCORE) | EQUAL TO OR LARGER THAN SINGLE APPLICATION THRESHOLD OR HIGH-ACCURACY THRESHOLD |
|---|---|---|
| 1 | 0.18 | TOTAL ACCURACY OF TOP FIVE ANSWERS IS EQUAL TO OR LESS THAN THRESHOLD |
| 2 | 0.16 | |
| 3 | 0.14 | |
| 4 | 0.12 | |
| 5 | 0.10 | |
| 6 | 0.08 | THIS AND SUBSEQUENT ANSWERS ARE DISCARDED |
| 7 | 0.06 | |

FIG. 12

| IDENTIFIER | PARAMETER NAME | PARAMETER VALUE |
|---|---|---|
| S1 | SINGLE APPLICATION THRESHOLD | 0.70 |
| S2 | HIGH-ACCURACY THRESHOLD | 0.95 |
| S3 | LOW-ACCURACY THRESHOLD | 0.85 |
| S4 | DETERMINATION THRESHOLD FOR DETERMINING THAT RELATIONSHIP IS LOW | 0.22 |
| P1 | MAXIMUM NUMBER OF ANSWERS PER RESPONSE | 5 |
| P2 | MAXIMUM NUMBER OF RESPONSES BEFORE ALTERNATIVE ANSWER | 4 |
| P3 | MAXIMUM NUMBER OF RESPONSES AFTER ALTERNATIVE ANSWER | 10 |

FIG. 15A  131  {"text" : "What is a procedure for changing the person in charge?"}

FIG. 15B  132  {"text" : "What is a procedure for changing the person in charge?" , "results_number" : "50"}

FIG. 15C  133
```
{"session_id" : "20171116113533396878" ,        ~133a
 "state" : "20" ,                                 133b
 "results" : {
   "1" : {"query" : "I changed the person in charge ... " ,
          "faq_id" : "K02-01-01" , "score" : "0.5494"} ,
   "2" : {"query" : "I want to add a person in charge ... " ,
          "faq_id" : "K02-01-01" , "score" : "0.4467"} ,   133c
   ...}}
```

FIG. 15D  134
```
{"session_id" : "20171116113533396878" ,        ~134a
 "state" : "20" ,                                 134b
 "results" : {
   "1" : {"query" : "I changed the person in charge ... " ,
          "faq_id" : "K02-01-01" , "score" : "0.5494"} ,
   "2" : {"query" : "I want to add a person in charge ... " ,
          "faq_id" : "K02-01-01" , "score" : "0.4467"} ,   134c
   ...}}
```

FIG. 18A

```
{"text" : "yes",                                    ~ 151a
 "faq_id" : "K01-02-01-02",                         ~ 151b
 "session_id" : "20171116113533968478"}             ~ 151c
```
~ 151

FIG. 18B

```
{"faq_id" : "K01-02-01-02",                         ~ 152a
 "session_id" : "20171116113533968478"}             ~ 152b
```
~ 152

FIG. 18C

```
{"session_id" : "20171116113533396878",             ~ 153a
 "state" : "ok"                                     ~ 153b
 "results" : {
   "1" : {"faq_id" : "K02-01-01", "score" : "0.5494"},   ⎫
   "query" : "I changed the person in charge ...",       ⎬ 153c
   "answer" : "The person in charge of the design sheet ..."}}   ⎭
```
~ 153

FIG. 18D

```
{"session_id" : "20171116113533396878",             ~ 154a
 "state" : "ok"                                     ~ 154b
 "results" : {
   "1" : {"faq_id" : "K02-01-01", "score" : "0.5494"},   ⎫
   "query" : "...",                                      ⎬ 154c
   "answer" : "The person in charge of the design sheet ..."}}   ⎭
```
~ 154

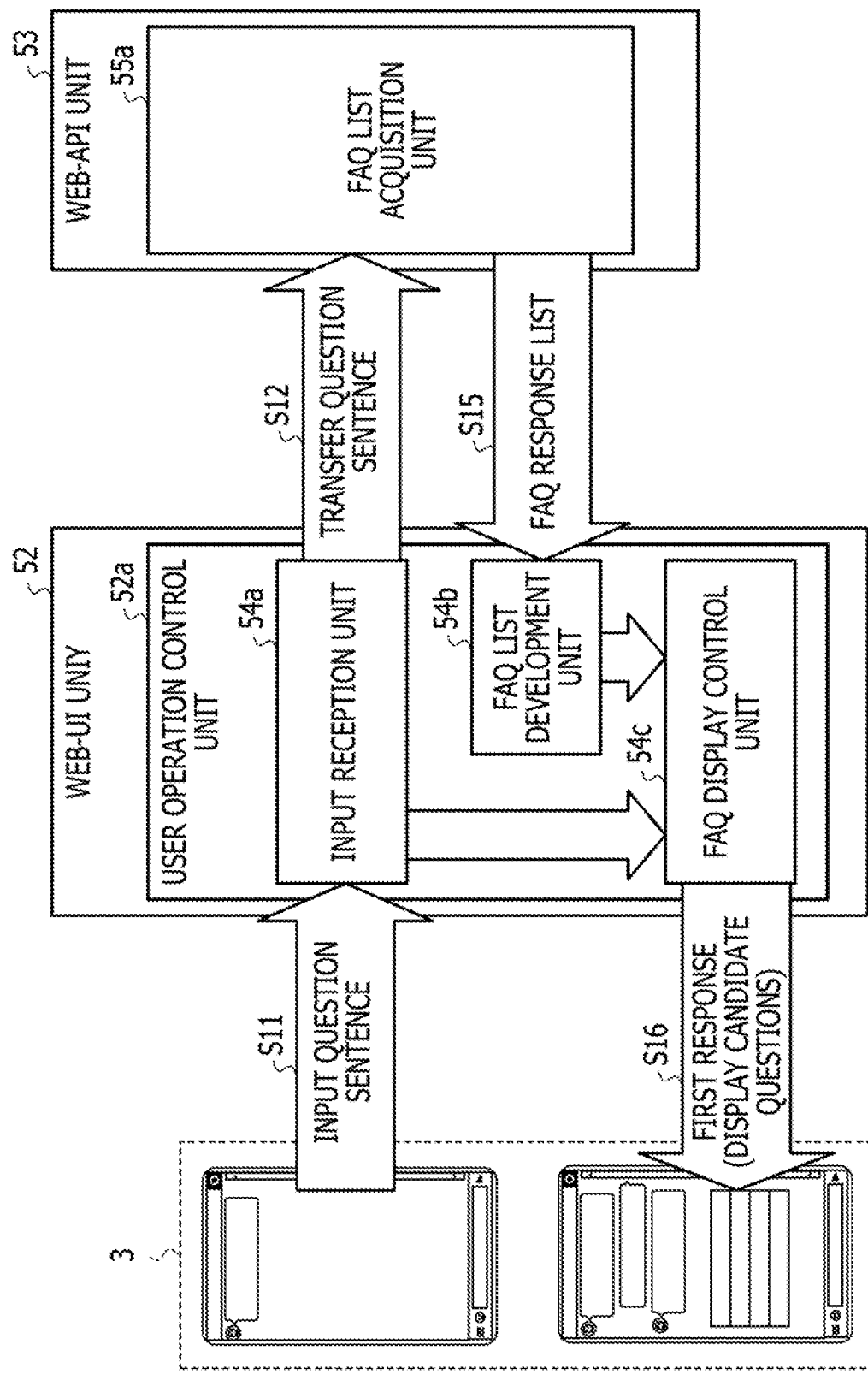

FIG. 20

| ANSWER RANK | FAQ QUESTION SENTENCE ID | FAQ QUESTION SENTENCE | ACCUACY | RESPONSE NUMBER |
|---|---|---|---|---|
| 1 | K02-01-01-01 | I changed the person in charge. What should I do? | 0.5494 | null |
| 2 | K02-01-01-02 | I want to add a person in charge. What should I do? | 0.4667 | null |
| 3 | K03-00-00-01 | The person in charge of you was changed, but this system has not been taken over yet. | 0.2601 | null |
| ... | ... | ... | ... | ... |
| 50 | K01-13-07-06 | Could you come here and explain operation? | 0.0800 | null |

| ANSWER RANK | FAQ QUESTION SENTENCE ID | ACCURACY | DETERMINATION RESULT | RESPONSE NUMBER | REMARKS |
|---|---|---|---|---|---|
| 1 | K04-01-03-01 | 0.7546 | 0.7546 | 1 | |
| 2 | K01-04-01-04 | 0.1033 | | null | BECAUSE DETERMINATION RESULT IS EQUAL TO OR LESS THAN LOW-ACCURACY THRESHOLD S3, RESPONSE IS MADE BY USING ALTERNATIVE ANSWER HEREINAFTER |
| 3 | K01-02-01-01 | 0.1007 | 0.4925 | null | |
| 4 | K01-04-01-05 | 0.0980 | | null | |
| 5 | K02-02-01-01 | 0.0979 | | null | |
| 6 | K01-01-08-05 | 0.0926 | | null | |
| 7 | K01-02-04-01 | 0.0018 | | null | |
| 8 | K01-01-05-05 | 0.0906 | | null | |
| 9 | K01-02-04-03 | 0.0878 | | null | |
| 10 | K01-01-12-03 | 0.0850 | | null | |
| 11 | K01-04-04-03 | 0.0822 | | null | |
| 12 | K01-04-04-04 | 0.0808 | | null | |
| 13 | K01-04-06-01 | 0.0648 | | null | |
| 14 | K01-01-05-11 | 0.0638 | | null | |
| 15 | K01-01-14-14 | 0.0637 | | null | |
| 16 | K01-01-07-04 | 0.0576 | | null | |
| 17 | K01-01-01-16 | 0.0563 | | null | |
| 18 | K01-01-08-16 | 0.0556 | | null | |
| 19 | K02-02-02-01 | 0.0545 | | null | |
| 20 | K02-02-01-02 | 0.0502 | | null | |

| ANSWER RANK | FAQ QUESTION SENTENCE ID | ACCURACY | DETERMINATION RESULT | RESPONSE NUMBER | REMARKS |
|---|---|---|---|---|---|
| 1 | K02-01-01-01 | 0.5494 | 1.0161 | 1 | |
| 2 | K02-01-01-02 | 0.4667 | | 1 | |
| 3 | K03-00-00-01 | 0.2601 | 0.9695 | 2 | |
| 4 | K02-01-01-03 | 0.2486 | | 2 | |
| 5 | K01-04-08-08 | 0.2318 | | 2 | |
| 6 | K01-13-07-02 | 0.2290 | | 2 | |
| 7 | K03-06-03-01 | 0.2198 | 1.0527 | 3 | |
| 8 | K02-01-02-02 | 0.2193 | | 3 | |
| 9 | K01-04-04-13 | 0.2083 | | 3 | |
| 10 | K02-01-02-01 | 0.2051 | | 3 | |
| 11 | K03-01-04-05 | 0.2002 | | 3 | |
| 12 | K02-02-01-07 | 0.1743 | 0.8259 | null | BECAUSE DETERMINATION RESULT IS EQUAL TO OR LESS THAN LOW-ACCURACY THRESHOLD S3, RESPONSE IS MADE BY USING ALTERNATIVE ANSWER HEREINAFTER |
| 13 | K01-01-11-04 | 0.1684 | | null | |
| 14 | K01-02-08-02 | 0.1615 | | null | |
| 15 | K03-02-01-01 | 0.1614 | | null | |
| 16 | K01-01-02-02 | 0.1603 | | null | |
| 17 | K01-04-03-04 | 0.1538 | | null | |
| 18 | K01-09-01-03 | 0.1511 | | null | |
| 19 | K03-02-01-04 | 0.1510 | | null | |
| 20 | K01-02-08-09 | 0.1505 | | null | |

| ANSWER RANK | FAQ QUESTION SENTENCE ID | ACCURACY | DETERMINATION RESULT | RESPONSE NUMBER | REMARKS |
|---|---|---|---|---|---|
| 1 | K03-05-04-01 | 0.5188 | 1.0155 | 1 | |
| 2 | K03-05-04-03 | 0.4967 | | 1 | |
| 3 | K03-05-01-05 | 0.4728 | 1.1718 | 2 | |
| 4 | K03-05-01-02 | 0.3698 | | 2 | |
| 5 | K03-05-04-02 | 0.3292 | | 2 | |
| 6 | K03-05-01-01 | 0.3267 | 1.1789 | 3 | |
| 7 | K03-05-01-04 | 0.2950 | | 3 | |
| 8 | K01-01-06-03 | 0.2865 | | 3 | |
| 9 | K03-05-01-03 | 0.2716 | 0.8848 | 3 | |
| 10 | K01-01-01-37 | 0.2254 | | 4 | |
| 11 | K01-02-08-01 | 0.2156 | | 4 | |
| 12 | K03-05-02-01 | 0.1622 | | 4 | |
| 13 | K01-01-02-13 | 0.1484 | | 4 | |
| 14 | K01-01-11-03 | 0.1332 | | null | BECAUSE DETERMINATION RESULT IS EQUAL TO OR LESS THAN MAXIMUM NUMBER OF RESPONSES P2 BEFORE ALTERNATIVE ANSWER, RESPONSE IS MADE BY USING ALTERNATIVE ANSWER HEREINAFTER |
| 15 | K01-02-07-02 | 0.1320 | | null | |
| 16 | K01-01-09-02 | 0.1122 | | null | |
| 17 | K02-04-00-01 | 0.1095 | | null | |
| 18 | K01-01-02-02 | 0.1037 | | null | |
| 19 | K01-02-08-09 | 0.1005 | | | |
| 20 | K02-02-01-04 | 0.0976 | | null | |

FIG. 32

| ANSWER RANK | FAQ QUESTION SENTENCE ID | ACCURACY | DETERMINATION RESULT | RESPONSE NUMBER | REMARKS |
|---|---|---|---|---|---|
| 1 | K04-03-03-01 | 0.4418 | | 1 | |
| 2 | K01-09-03-02 | 0.2986 | 1.0057 | 1 | |
| 3 | K01-01-17-04 | 0.2653 | | 1 | BECAUSE DETERMINATION RESULT IS EQUAL TO OR LESS THAN LOW-ACCURACY THRESHOLD S3, RESPONSE IS MADE BY USING ALTERNATIVE ANSWER HEREINAFTER |
| 4 | K01-01-01-43 | 0.1964 | | null | |
| 5 | K01-01-01-42 | 0.1696 | 0.8259 | null | |
| 6 | K01-01-08-02 | 0.1696 | | null | |
| 7 | K01-04-02-05 | 0.1572 | | null | |
| 8 | K01-03-01-04 | 0.1338 | | null | |
| 9 | K01-01-11-03 | 0.1318 | | null | |
| 10 | K01-03-02-01 | 0.1216 | | null | |
| 11 | K01-04-01-07 | 0.1163 | | null | |
| 12 | K01-01-01-29 | 0.0996 | | null | |
| 13 | K03-01-01-05 | 0.0996 | | null | |
| 14 | K01-04-01-31 | 0.0989 | | null | |
| 15 | K01-08-03-01 | 0.0169 | | null | |
| 16 | K01-08-05-01 | 0.0092 | | null | |
| 17 | K02-02-01-06 | 0.0034 | | null | |
| 18 | K02-02-04-04 | 0.0034 | | null | |
| 19 | K01-04-01-10 | 0.0033 | | null | |
| 20 | K02-01-01-02 | 0.0030 | | null | |

| ANSWER RAN | FAQ QUESTION SENTENCE ID | ACCURACY | DETERMINATION RESULT | RESPONSE NUMBER | REMARKS |
|---|---|---|---|---|---|
| 1 | K01-13-02-01 | 0.1612 | 0.6366 | null | BECAUSE DETERMINATION RESULT IS EQUAL TO OR LESS THAN LOW-ACCURACY THRESHOLD S3, RESPONSE IS MADE BY USING ALTERNATIVE ANSWER HEREINAFTER |
| 2 | K01-01-06-04 | 0.1241 | | null | |
| 3 | K01-01-08-04 | 0.1241 | | null | |
| 4 | K01-02-08-02 | 0.1180 | | null | |
| 5 | K03-06-03-01 | 0.1092 | 0.5192 | null | |
| 6 | K01-13-07-06 | 0.1075 | | null | |
| 7 | K01-08-03-04 | 0.1060 | | null | |
| 8 | K01-09-04-01 | 0.1034 | | null | |
| 9 | K01-02-02-02 | 0.1015 | | null | |
| 10 | K01-01-02-02 | 0.1008 | | null | |
| 11 | K01-01-05-11 | 0.1004 | | null | |
| 12 | K01-12-01-03 | 0.1004 | | null | |
| 13 | K01-01-11-02 | 0.0997 | | null | |
| 14 | K01-02-05-01 | 0.0994 | | null | |
| 15 | K03-01-04-04 | 0.0992 | | null | |
| 16 | K01-04-06-01 | 0.0989 | | null | |
| 17 | K03-01-04-03 | 0.0989 | | null | |
| 18 | K01-03-05-07 | 0.0984 | | null | |
| 19 | K01-03-05-03 | 0.0981 | | null | |
| 20 | K01-01-07-03 | 0.0979 | | null | |

COMPUTER-READABLE RECORDING MEDIUM RECORDING OUTPUT CONTROL PROGRAM, OUTPUT CONTROL METHOD, AND INFORMATION PROCESSING APPARATUS

CROSS-REFERENCE TO RELATED APPLICATION

This application is a continuation application of International Application PCT/JP2018/000771 filed on Jan. 15, 2018 and designated the U.S., the entire contents of which are incorporated herein by reference.

FIELD

The embodiment relates to an output control program, an output control method, and an output control apparatus.

BACKGROUND

Automatic conversation programs using artificial intelligence (AI) have been used in recent years. There is mainly realized searching for a providable service from a knowledge database obtained by AI in response to an inquiry input by a user to thereby provide information.

Related art is disclosed in Japanese Laid-open Patent Publication No. 2015-36945, Japanese Laid-open Patent Publication No. 2005-202627 and Japanese Laid-open Patent Publication No. 2004-171479.

SUMMARY

According to an aspect of the embodiments, a non-transitory computer-readable recording medium records an output control program for causing a computer to execute processing of: in a case where input of a question is accepted, extracting an accuracy of each of one or a plurality of answers to the question, the accuracy being stored in a storage unit; and selecting an answer to be output from the one or plurality of answers so that a total value of the accuracy of the one or plurality of answers to the question is equal to or larger than a first threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is an explanatory diagram of an example of display control by a WEB-UI unit.
FIG. 9 is an explanatory diagram of another example of display control by a WEB-UI unit.
FIGS. 10A to 10C are explanatory diagrams of determination examples.
FIG. 12 illustrates parameter examples.
FIGS. 15A to 15D illustrate telegraphic message examples in steps 12 to S15.
FIGS. 18A to 18D illustrate telegraphic message examples in steps S20 to S23.
FIG. 19 is an explanatory diagram of a processing flow in a user operation control unit in the first response processing.
FIG. 20 illustrates an exemplary data structure of an FAQ response list.
FIG. 26 illustrates exemplary data of a table regarding display control in Operation 1.
FIG. 28 illustrates exemplary data of a table regarding display control in Operation 2.
FIG. 30 illustrates exemplary data of a table regarding display control in Operation 3.
FIG. 32 illustrates exemplary data of a table regarding display control in Operation 4.
FIG. 34 illustrates exemplary data of a table regarding display control in Operation 5.

DESCRIPTION OF EMBODIMENTS

For example, in a case where it is difficult to select an answer to a question written in a natural sentence from a frequently-asked-questions (FAQ) database, a related question, a reverse question, or the like is output in order to provide information with high accuracy.

An automatic conversation program is referred to as "chatbot". The chatbot generally makes conversation in the form of questions and answers, and thus, in a case where an output answer is not an answer that a user requires, the user needs to additionally input another question in order to obtain another answer. Meanwhile, if all possible answers are output, the user needs to determine which answer is appropriate, which is extremely troublesome.

Therefore, in one aspect, an answer according to accuracy of the answer may be flexibly output.

Figure 1:
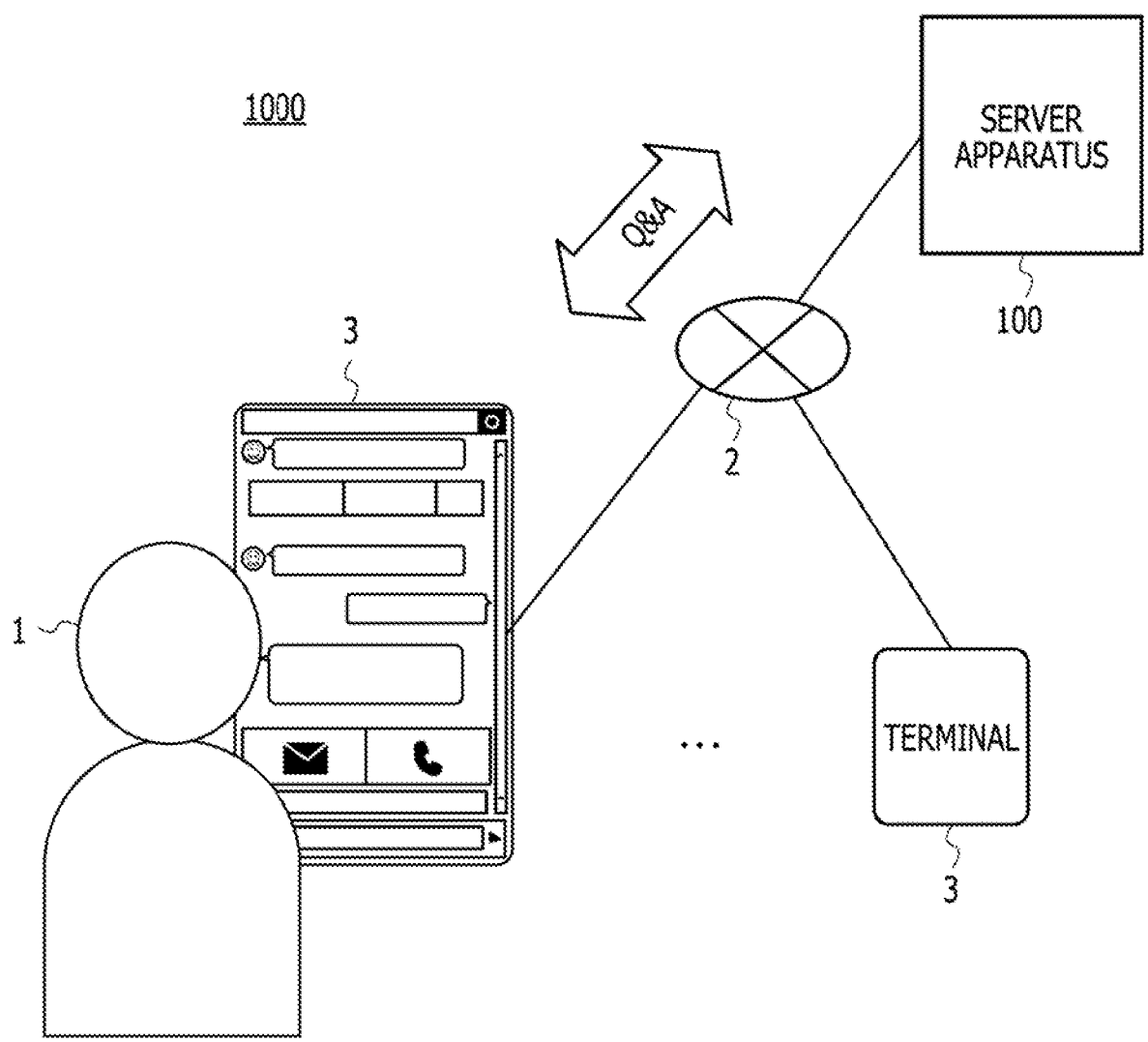
FIG. 1 illustrates an exemplary configuration of a system.

Hereinafter, an embodiment of the present invention will be described with reference to the drawings. First, a system regarding a chatbot will be described. FIG. 1 illustrates an exemplary configuration of the system. In FIG. 1, a system 1000 includes a plurality of user terminals 3 and a server apparatus 100. Each user terminal 3 and the server apparatus 100 are connectable via the Internet 2.

The plurality of user terminals 3 is information processing terminals used by users 1, and includes a browser, a specific application for a chatbot, and the like. The server apparatus 100 is an information processing apparatus that responds to a question from the user 1 and makes conversation with the user 1 by using a chatbot using artificial intelligence (AI), and corresponds to an output control apparatus that controls output (answer) in response to input of a question.

For the purpose of supporting a call center using AI, the inventors and the like mounted a frequently-asked-questions (FAQ) chatbot on such a system 1000 and implemented proof of concept (PoC) by the user 1. As a result, the following problems became apparent.

Online chat is basically conversation in the form of questions and answers, and thus, in a case where the user 1 does not obtain an answer that the user requires, the number of conversations is increased and the time and effort for input is increased.

However, a plurality of answers can be given to a question in some cases. This case is performed only when a plurality of answers to a question is defined to some extent.

In a case where a plurality of answers is given and there are too many answers, the chatbot is no longer appropriately used, and it is desirable to use a search engine instead of online chat. Control thereof is not appropriately performed.

In a case where the user 1 does not immediately obtain the number of times that the user requires, the user 1 may be dissatisfied. That is, stress put on the user 1 increases as conversation continues. This phenomenon also occurs in general conversation with people.

From the above, in order to improve convenience of the chatbot that supports a call center for the user 1, the following points are problems:

to give an answer that the user 1 requires as a first response if possible;

to give a plurality of answers as a response in a case where accuracy of the answers is not so high; and to immediately give an answer that leads the user to a call center by telephone, e-mail, or the like in a case where no appropriate answer is obtained (in a case where there are only low-accuracy answers).

In order to solve the above problems, the inventors and the like have devised a mechanism for changing the contents to be displayed on a user interface (UI) in accordance with accuracy of answers and a degree of fulfillment of answers (knowledge) of an FAQ search engine. For example, a plurality of answers, e.g., about one to five answers are given to a question in accordance with accuracy indicating likelihood of the answers obtained by a search engine. The accuracy indicates that the answer is more accurate as the accuracy is closer to 1, and the answer is less accurate as the accuracy is closer to 0.

The number of answers given as a response is controlled as follows:

a case of high accuracy: a small number of answers; and a case of low accuracy: a large number of answers.

In a case where the accuracy of the answers is too low, a response is made by adding "Connect to the call center" to the beginning of the answers.

Specifically, the number of answers is made variable according to the accuracy of the answers, instead of being fixed.

To process a plurality of answers to a question in descending order of accuracy.

In a case where there is a plurality of answers, to determine the number of answers included in a response on the basis of a threshold (high-accuracy threshold S2 described below) for determining the number of answers per response with respect to a sum total of answers having high accuracies. Regarding the number of answers, the number of answers obtained when accuracies are added from the highest accuracy and a sum total of accuracies is equal to or larger than the high-accuracy threshold S2 is adopted.

Meanwhile, an answer that leads the user to the call center is immediately given to a question that is difficult to answer.

In a case where there is a plurality of answers, to determine whether or not the question is a question to give an answer that leads the user to the call center on the basis of a threshold (low-accuracy threshold S3 described below) for determining that it is difficult to answer the question with respect to a sum total of high accuracies of the maximum number (about one to five) of answers. In a case where the sum total of the high accuracies of the maximum number (about one to five) of answers is equal to or less than the threshold, it is determined that it is difficult to answer the question.

With such a specific configuration, a function of the server apparatus 100 can be improved. A hardware configuration of such a server apparatus 100 is, for example, a hardware configuration illustrated in FIG. 2.

Figure 2:
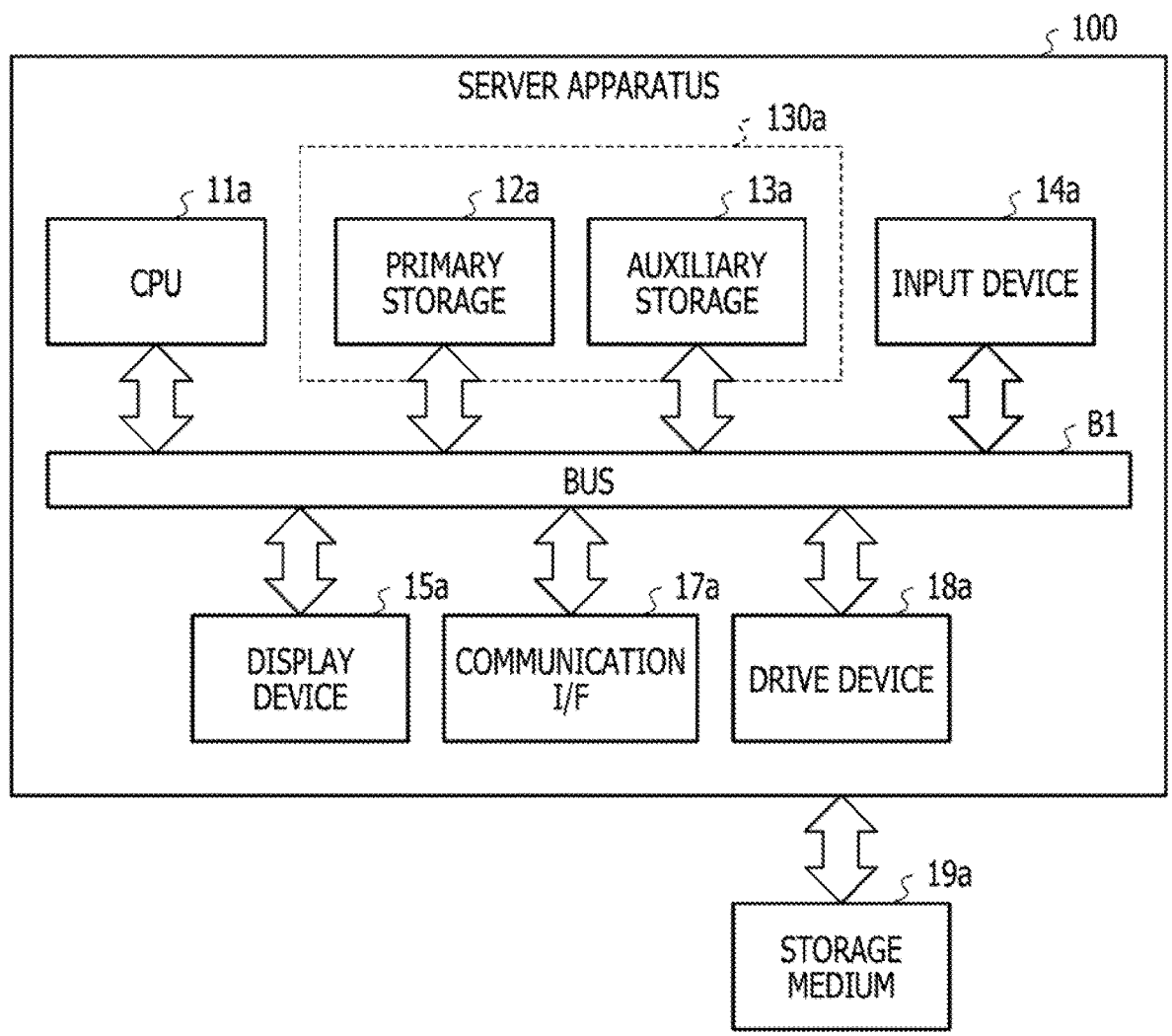
FIG. 2 illustrates a hardware configuration of a server apparatus.

FIG. 2 illustrates a hardware configuration of the server apparatus. In FIG. 2, the server apparatus 100 is an information processing apparatus controlled by a computer, and includes a central processing unit (CPU) 11a, a primary storage 12a, an auxiliary storage 13a, an input device 14a, and a display device 15a, a communication interface (I/F) 17a, and a drive device 18a, which are connected to a bus 81.

The CPU 11a corresponds to a processor that controls the server apparatus 100 in accordance with a program stored in the primary storage 12a. The primary storage 12a is a random access memory (RAM), a read only memory (ROM), or the like, and stores or temporarily stores programs executed by the CPU 11a, data necessary for processing in the CPU 11a, and data obtained by processing in the CPU 11a, and the like.

The auxiliary storage 13a is a hard disk drive (HDD) or the like, and stores data such as programs for executing various kinds of processing. Some of the programs stored in the auxiliary storage 13a are loaded into the primary storage 12a and are executed by the CPU 11a. Thus, various kinds of processing are realized. One or more of the primary storage 12a, the auxiliary storage 13a, and an external storage device accessible by the server apparatus 100 correspond to a storage unit 130a.

The input device 14a includes a mouse, a keyboard, and the like, and is used by a user to input various kinds of information required for processing performed by the server apparatus 100. The display device 15a displays various kinds of necessary information under the control of the CPU 11a. The input device 14a and the display device 15a may be a user interface including an integrated touchscreen or the like. The communication I/F 17a performs communication via, for example, a wired or wireless network. Communication by the communication I/F 17a is not limited to communication via a wireless or wired network.

The drive device 18a serves as an interface between a storage medium 19a (for example, a CD-ROM or the like) set in the drive device 18a and the server apparatus 100. Programs for realizing processing performed by the server apparatus 100 are provided for the server apparatus 100 via, for example, the storage medium 19a such as a compact disc read-only memory (CD-ROM). Programs for realizing various kinds of processing according to this embodiment described below are stored in the storage medium 19a, and the programs stored in the storage medium 19a are installed in the server apparatus 100 via the drive device 18a. The installed programs are executable by the server apparatus 100.

Note that the storage medium 19a for storing the programs is not limited to a CD-ROM, and only needs to be one or more computer-readable non-transitory tangible media having a structure. A computer-readable storage medium may be not only a CD-ROM but also a portable recording medium such as a digital versatile disk (DVD) and a USB memory, a semiconductor memory such as a flash memory, or the like.

Figure 3:
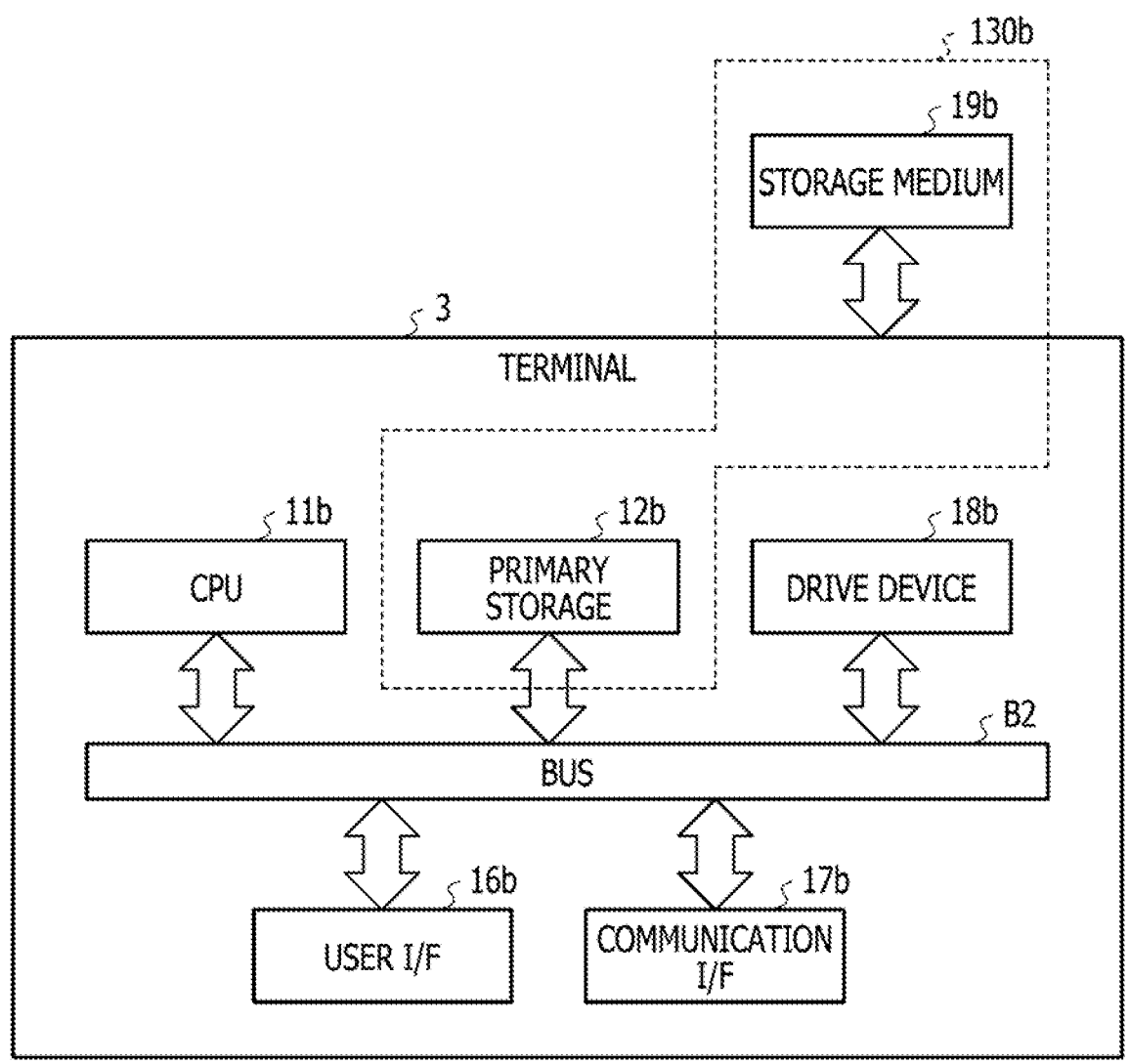
FIG. 3 illustrates a hardware configuration of a user terminal.

FIG. 3 illustrates a hardware configuration of the user terminal. In FIG. 3, the user terminal 3 is an information processing terminal controlled by a computer, such as a tablet information processing terminal or a mobile phone, and includes a central processing unit (CPU) 11b, a primary storage 12b, and a user interface (I/F) 16b, a communication I/F 17b, and a drive device 18b, which are connected to a bus 82.

The CPU 11b corresponds to a processor that controls the user terminal 3 in accordance with a program stored in the primary storage 12b. The primary storage 12b is a random access memory (RAM), a read only memory (ROM), or the like, and stores or temporarily stores programs executed by the CPU 11b, data necessary for processing in the CPU 11b, and data obtained by processing in the CPU 11b, and the like. The programs stored in the primary storage 12b are executed by the CPU 11b, and thus various kinds of processing are realized.

The user I/F 16b is a touchscreen or the like that displays various kinds of necessary information under the control of the CPU 11b and can accept operation input from the user. Communication by the communication I/F 17b is not limited to communication via a wireless or wired network.

A program for realizing processing performed by the user terminal 3 is downloaded from an external device via a network 2. Alternatively, the program may be stored in the primary storage 12b or the storage medium 19b of the user terminal 3 in advance. The primary storage 12b and/or the storage medium 19b correspond to a storage unit 130b.

The drive device 18b serves as an interface between the storage medium 19b (for example, secure digital (SD) memory card or the like) set in the drive device 18b and the user terminal 3. Note that the storage medium 19b only needs to be one or more computer-readable non-transitory tangible media having a structure.

The user terminal 3 may be desktop, notebook, laptop, or other types of information processing terminals. A hardware configuration thereof is the same as the hardware configuration in FIG. 2, and thus description thereof will be omitted.

Figure 4:
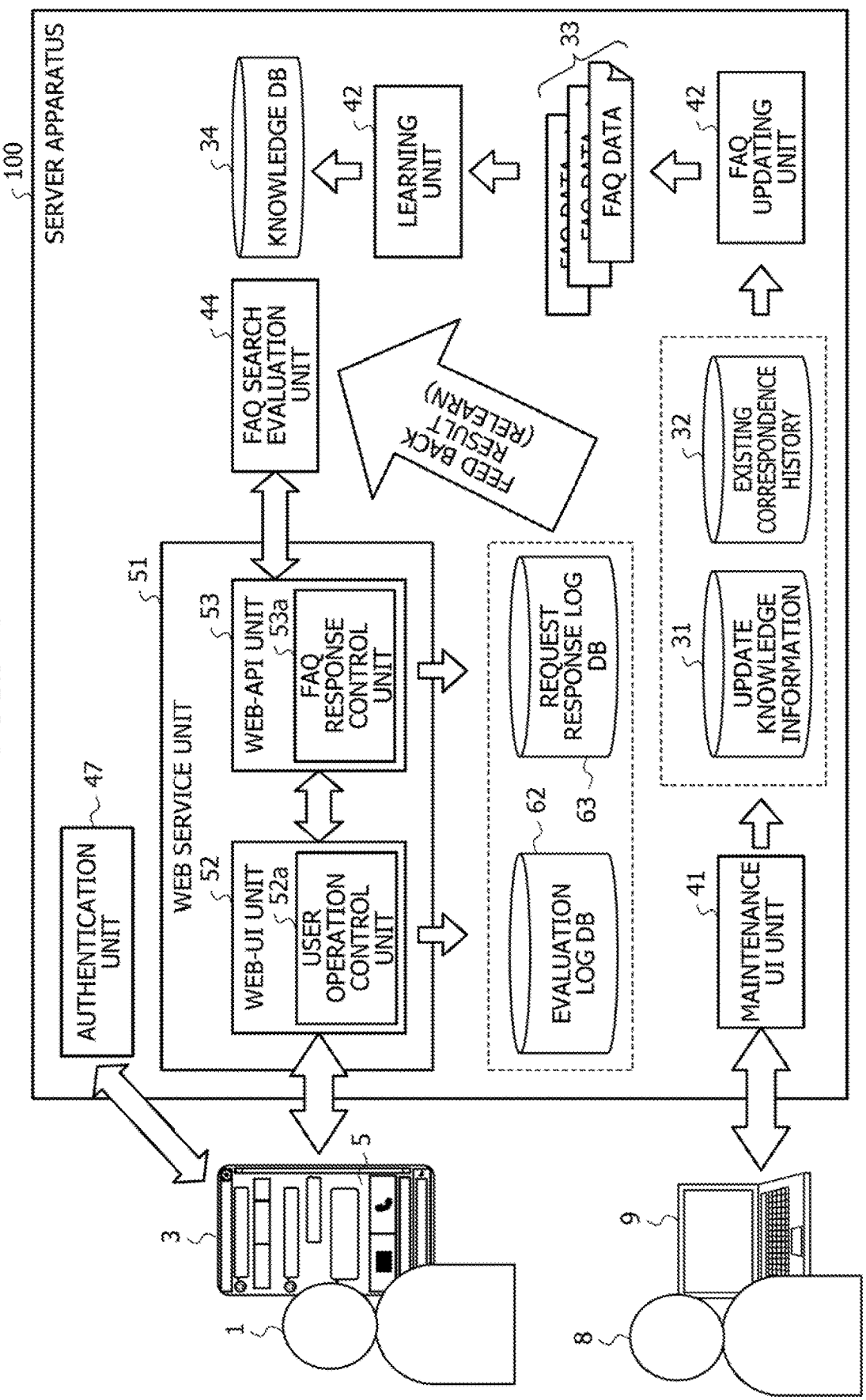
FIG. 4 illustrates an exemplary functional configuration of a server apparatus.

FIG. 4 illustrates an exemplary functional configuration of the server apparatus. In FIG. 4, the server apparatus 100 includes a maintenance UI unit 41, an FAQ updating unit 42, a learning unit 43, an FAQ search evaluation unit 44, an authentication unit 47, and a WEB service unit 51 as processing units. The processing units 41 to 44, 47, and 51 are realized by processing that the corresponding programs cause the CPU 11a to execute. The storage unit 130a stores update knowledge information 31, an existing correspondence history 32, FAQ data 33, a knowledge DB 34, an evaluation log 62, a request response log 63, and the like. Hereinafter, an example of supporting a call center will be described, but this embodiment is not limited to this example.

The maintenance UI unit 41 provides a maintenance screen of knowledge information for an administrator terminal 9 of an administrator 8 of the server apparatus 100. The administrator 8 uses the maintenance screen displayed on the administrator terminal 9 to, for example, add, edit, and delete the knowledge information. The update knowledge information 31 obtained from the administrator terminal 9 is stored in the storage unit 130a.

The FAQ updating unit 42 outputs the updated FAQ data 33 to the storage unit 130a on the basis of the update knowledge information 31 and the existing correspondence history 32. The learning unit 43 analyzes the FAQ data 33 and outputs the knowledge DB 34 to the storage unit 130a. The FAQ data 33 shows a pair of a question sentence and an answer sentence.

The FAQ search evaluation unit 44 corresponds to a bot engine, and searches the knowledge DB 34 in response to a search request from the WEB service unit 51, evaluates the search result, and calculates (scores) accuracy. The authentication unit 47 authenticates the user 1 in response to a request to the server apparatus 100 for a WEB service, and permits the user 1 to use the WEB service in a case where the authentication is successfully performed.

The WEB service unit 51 provides a search service for the user 1 authenticated by the authentication unit 47. The WEB service unit 51 displays a conversational UI screen 5 on the user terminal 3 of the user 1, accepts a question from the user 1 on the UI screen 5, and displays a response to the question. The WEB service unit 51 includes a WEB-UI unit 52 and a WEB-API unit 53.

Upon receipt of a question on the UI screen 5 of the user terminal 3, the WEB-UI unit 52 performs control of notifying the FAQ search evaluation unit 44 of the reception via the WEB-API unit 53 and displaying, on the UI screen 5, one or more answers selected by the WEB-API unit 53 from search results obtained by the FAQ search evaluation unit 44.

The WEB-UI unit 52 includes a user operation control unit 52a that performs display control of the UI screen 5 in response to user operation performed on the UI screen 5. Based on an FAQ response list received from the WEB-API unit 53, the user operation control unit 52a creates, for example, display data that displays one or a plurality of answers to be included in a response in a selectable manner, transmits the display data to the user terminal 3, and displays the display data thereon. When evaluation information indicating evaluation of the WEB service provided by the server apparatus 100 from the user 1 is acquired, the evaluation information is recorded in the evaluation log DB 62.

Upon receipt of the question from the WEB-UI unit 52, the WEB-API unit 53 transmits an inquiry to the FAQ search evaluation unit 44, receives a search result with scores, determines the number of answers to the question, whether to lead the user to a call center, or the like on the basis of the scores, and creates response information. The created response information is transmitted to the user terminal 3 by the WEB-UI unit 52 and is displayed on the UI screen 5 of the user terminal 3.

The WEB-API unit 53 includes an FAQ response control unit 53a that controls the number of answers to be included in a response to a question. Upon receipt of an FAQ search result from the FAQ search evaluation unit 44, the FAQ response control unit 53a determines the number of answers to be included in a response, and transmits, to the WEB-UI unit 52, an FAQ response list in which answers corresponding to the determined number of answers are listed. The question and the FAQ response list are recorded in the request response log DB 63. The WEB-UI unit 52 notifies the user operation control unit 52a of the FAQ response list. The evaluation log DB 62 and the request response log DB 63 are fed back to the FAQ search evaluation unit 44 to improve accuracy of answers.

Figure 5:
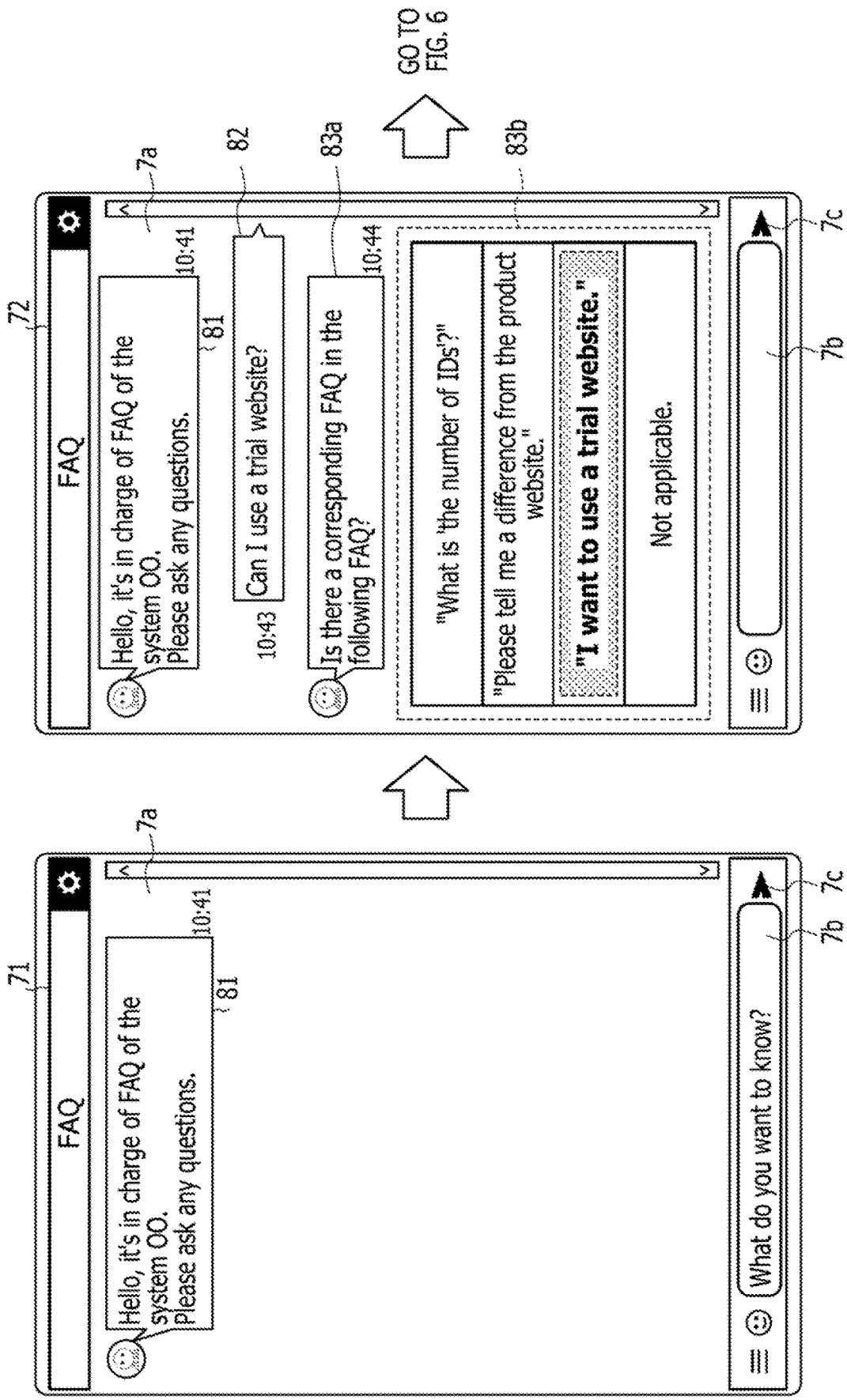
FIG. 5 is an explanatory diagram of an example of display control by a WEB-UI unit.

First, display control by the WEB-UI unit 52 in response to user operation will be described. First, transition of the UI screen 5 by display control, which is performed in a case where a question is solved, will be described. FIGS. 5 and 6 are explanatory diagrams of an example of display control by the WEB-UI unit.

In FIG. 5, UI screens 71 and 72 include a conversation display 7a, a question input area 7b, and a transmission mark 7c. In the conversation display 7a, a left-justified conversation sentence indicates an utterance from the server apparatus 100, and a right-justified conversation sentence indicates the contents of a question or the like input by the user 1. The same applies to screen examples described below.

The UI screen 71 shows an example of an initial display state, and displays, for example, a conversation sentence 81 "Hello, it's in charge of FAQ of the system OO. Please ask any questions if you need any assistance." at the top and prompts the user 1 to input a question sentence. When the user 1 inputs the contents of a question to the question input area 7b and selects the transmission mark 7c, the UI screen 72 is displayed on the user terminal 3.

When the user 1 inputs a question sentence 82 "Can I use a trial website?" and selects the transmission mark 7c on the UI screen 72, a response sentence 83a and an optional sentence 83b are included in a response and are transmitted from the server apparatus 100. The response sentence 83a and the optional sentence 83b received from the server apparatus 100 are displayed.

The response sentence 83a displays a message that prompts the user 1 to select a sentence, such as "Is there a corresponding FAQ in the following FAQ?". Further, the optional sentence 83b includes a plurality of sentences selectable by the user. In this example, in order to specify intent of the question of the user 1, the following four options are shown:

""What is 'the number of IDs'?";
"Please tell me a difference from the product website.";
"I want to use a trial website."; and
Not applicable."

The options correspond to a plurality of answer sentences from the server apparatus 100. The same applies in the following description. The user 1 selects a sentence that specifies the question from those options. For example, in a case where the user 1 selects "I want to use a trial website.", the screen transitions to a UI screen 73 illustrated in FIG. 6.

In FIG. 6, in response to the selection of "I want to use a trial website." by the user 1, a question sentence 84 having the same contents is displayed in a right-justified manner. Then, response sentences 85a and 85b and a selection icon 85c are included in a response and are transmitted from the server apparatus 100. In response to reception of the response from the server apparatus 100, the response sentences 85a and 85b and the selection icon 85c are displayed in a left-justified manner.

The response sentence 85a indicates
"Please request the following information via e-mail.
Customer name (furigana), Representative . . . View more", and
the response sentence 85b indicates
"Was this information helpful?". A part 85a-2 "View more" is a character string selectable by the user 1. Further, in the selection icon 85c, icons for the response sentence 85b are displayed. In this example, icons such as "Yes" and "See other FAQ" are displayed in the selection icon 85c.

The user 1 selects the part 85a-2, checks details, and then selects "Yes" for the response sentence 85b. The UI screen 73 transitions to a UI screen 74. Full text of the response sentence 85a is displayed on the UI screen 74, and a response sentence 86 from the server apparatus 100 is displayed in response to the selection of "Yes" in the selection icon 85c. The response sentence 86 indicates
"I'm happy I could help.
Please ask me at any time.". The response sentence 86 means that a series of conversation ends, and is a sentence example used in a case where the question of the user 1 is solved.

Figure 7:
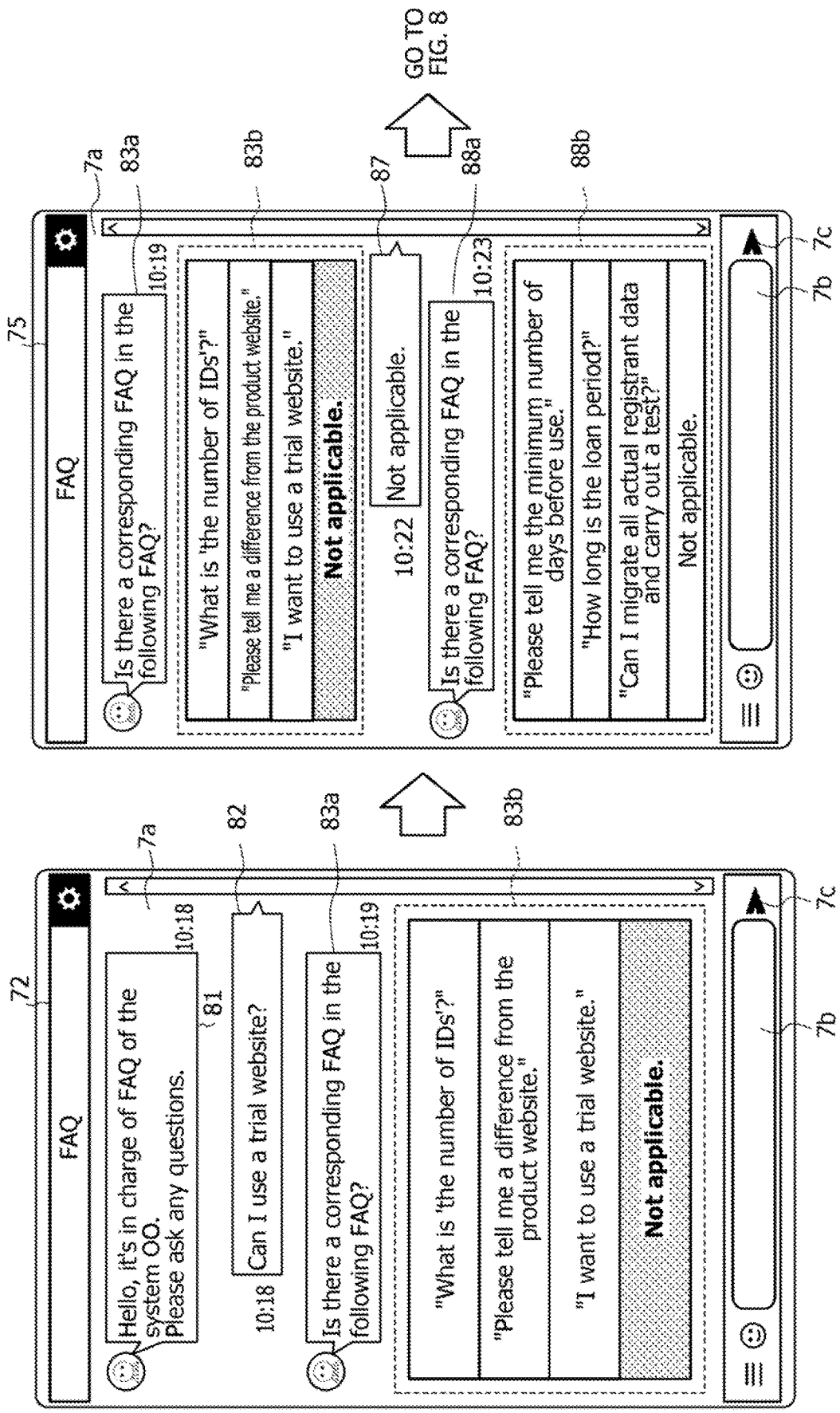
FIG. 7 is an explanatory diagram of another example of display control by a WEB-UI unit.
Figure 8:
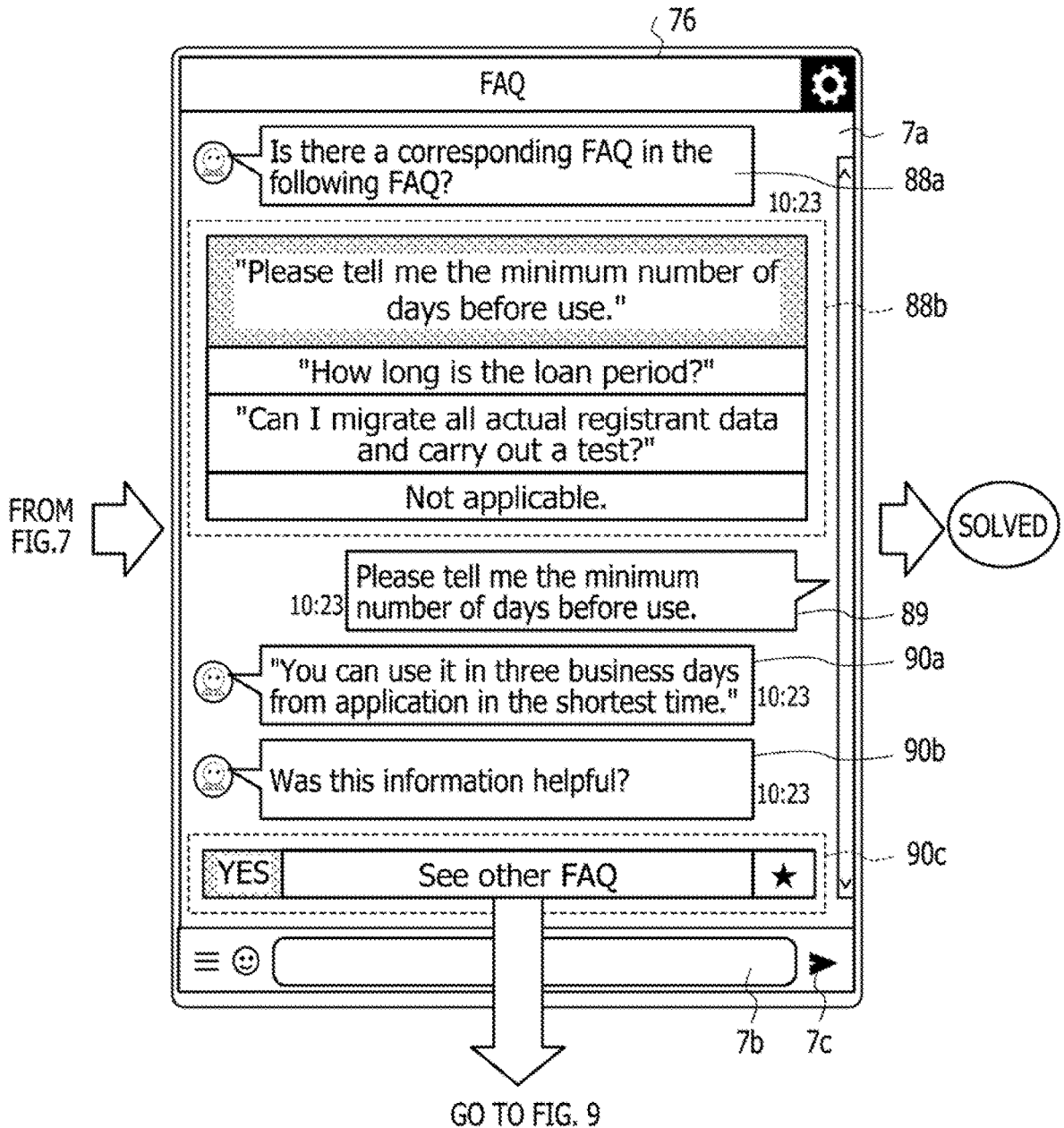
FIG. 8 is an explanatory diagram of another example of display control by a WEB-UI unit.

Next, a case where FAQ is searched for and a case where no answer is found in FAQ will be described by using a display control example from the UI screen 72 in FIG. 5. FIGS. 7 to 9 are explanatory diagrams of another example of display control by the WEB-UI unit.

In the UI screen 72 of FIG. 7, when the user selects "Not applicable" from the optional sentences 83b, the screen transitions to a UI screen 75. On the UI screen 75, a conversation sentence 87 indicating the selected sentence "Not applicable" Is displayed below the optional sentences 83b in a right-Justified manner on the UI screen 7a, and a response sentence 88a, an optional sentence 88b, and a selection icon 85c are included in a response and are transmitted from the server apparatus 100. The response sentence 88a and the optional sentence 88b received from the server apparatus 100 are displayed.

The response sentence 88a displays a message that prompts the user 1 to select a sentence, such as "Is there a corresponding FAQ in the following FAQ?". Further, the optional sentence 88b includes a plurality of sentences selectable by the user. In this example, in order to specify intent of the question of the user 1, the following four options are shown:

""Please tell me the minimum number of days before use.";
"What is the loan period?";
"Can I migrate all actual registrant data and carry out a test?"; and
Not applicable."

The user 1 selects a sentence that specifies the question from those options. The user 1 selects "Please tell me the minimum number of days before use."

FIG. 8 illustrates a UI screen 76 displayed in a case where the user 1 selects "Please tell me the minimum number of days before use." On the UI screen 76, a question sentence 89 indicating the selected sentence "Please tell me the minimum number of days before use." is displayed in a right-justified manner, and response sentences 90a and 90b and a selection icon 90c are transmitted from the server apparatus 100 as a response. In response to reception of the response from the server apparatus 100, the response sentences 90a and 90b and the selection icon 90c are displayed in a left-justified manner.

The response sentence 90a indicates

"You can use it in three business days from application in the shortest time.", and the response sentence 90b indicates "Was this information helpful?". Further, in the selection icon 90c, icons for the response sentence 90b are displayed. In this example, icons such as "Yes" and "See other FAQ" are displayed in the selection icon 90c. When the user 1 selects "Yes" from the selection icon 90c, a series of processing regarding this FAQ is terminated. Meanwhile, a case where "See other FAQ" is selected from the selection icon 90c on the UI screen 76 will be described with reference to FIG. 9.

On a UI screen 77 in FIG. 9, a conversation sentence 91 indicating "See other FAQ" is displayed in a right-justified manner in response to the selection of "See other FAQ" in the selection icon 90c. Response sentences 92a and 92b and optional sentences 92c are transmitted from the server apparatus 100 as a response. Then, the response sentences 92a and 92b and the optional sentences 92c from the server apparatus 100 are displayed in a left-justified manner.

The response sentence 92a indicates "I'm sorry I couldn't help.". The response sentence 92b indicates "Is there a corresponding FAQ in the following FAQ?". The optional sentences 92c is the same as the optional sentences 88b on the UI screen 76 in FIG. 8.

In a case where the user 1 selects "Not applicable." from the optional sentences 92c, the UI screen 77 transitions to a UI screen 78. On the UI screen 78, a conversation sentence 93 "Not applicable." is displayed in a right-justified manner below the optional sentences 92c. Further, a response sentence 94a, an optional sentence 94b, and a response sentence 94c are displayed in response to "Not applicable." from the server apparatus 100.

The response sentence 94a indicates "I will connect you to the help desk. Please select a contact method." The optional sentence 94b displays icons for allowing the user to select either e-mail or telephone. The response sentence 94c indicates "? See other FAQ for reference".

As described above, even in a case where an intended question cannot be specified from the contents input by the user 1, a response is made with a plurality of candidates by display control on the UI screen 5 provided by this embodiment. This makes it possible to reduce complexity of operation to find out the intended question. Further, it is also possible to shorten time required for giving an appropriate answer, as compared with a case of questions and answers. Furthermore, it is possible to determine that the question intended by the user 1 cannot be specified, and lead the user 1 to the call center.

In addition to the above, in this embodiment, the number of options at the time of responding to input from the user 1 is made variable on the basis of accuracy indicating appropriateness of a response. Hereinafter, input by the user 1 including selection will be collectively referred to as "questions", and responses from the server apparatus 100 will be referred to as "answers". Further, the number of options at the time of response corresponds to the number of answers. The server apparatus 100 in this embodiment variably controls the number of answers by selecting answers in descending order of accuracy from a plurality of answers to a question, in a case where the first accuracy is equal to or larger than a single application threshold, determining that the number of answers to respond is one, and determining the minimum number of answers in which a total sum of high accuracies is equal to or larger than a high-accuracy threshold.

In addition to the above, in a case where a sum total of accuracies of the maximum number of answers (for example, about one to five) determined in descending order of accuracy in advance is equal to or less than a low-accuracy threshold S3 (FIG. 12), the server apparatus 100 in this embodiment determines that it is difficult to answer the question, and performs display control of leading the user to the call center instead of answering the question.

An example of determining the number of answers and an example of determining that it is difficult to answer the question will be described with reference to FIGS. 10A to 10C. FIGS. 10A to 10C are explanatory diagrams of determination examples. FIGS. 10A to 10C illustrate search evaluation result examples provided by the FAQ search evaluation unit 44 for the WEB-API unit 53.

The search evaluation result includes items such as answer rank and accuracy (score). The answer rank indicates descending order of accuracy, and the accuracy (score) indicates accuracy of a searched answer. Further, a response time to be displayed in a series of conversation is additionally shown in association with the rank. In this example, a case where a single application threshold S1=0.70, a high-accuracy threshold S2=0.95, the low-accuracy threshold S3=0.80, and the maximum number of answers P1=5 will be described on the basis of parameter values of FIG. 12. However, the present invention is not limited to those values. The above values may be appropriately set by an administrator. Further, description will be made on the assumption that the total number of answers is seven. However, the present invention is not limited to this example.

FIG. 10A illustrates an example of the search evaluation result including an answer to be applied alone. In the example of FIG. 10A, the accuracy of an answer in an answer rank "1" is "0.95", and the accuracy of this answer alone is equal to or larger than the single application threshold S1. Therefore, the first response is made only with this answer.

Further, in a case where the user 1 desires another answer different from the answer applied alone, the second response is made with a plurality of answers determined in order from the answer rank "2" by using the high-accuracy threshold S2. The accuracy "0.65" in the answer rank "2" is equal to or less than the single application threshold S1, and thus the accuracy "0.55" in the answer rank "3" is added. The total accuracy is "1.20", which is equal to or larger than the high-accuracy threshold S2. Further, the total number of answers is two, which is equal to or less than the maximum number of answers P1. Therefore, in the second response, two answers in the answer ranks "2" and "3" are displayed on the user terminal 3 as optional sentences.

In a case where the user 1 desires another answer even in the second response, the third response is made with a plurality of answers determined in order from the answer rank "2" by using the high-accuracy threshold S2. When the accuracy "0.50" in the answer rank "4", the accuracy "0.40" in the answer rank "5", and the accuracy "0.35" in the answer rank "6" are summed up, the total accuracy is equal to or larger than the high-accuracy threshold S2 for the first time. Further, the total number of answers is three, which is equal to or less than the maximum number of answers P1. Therefore, in the third response, three answers in the answer rank "3", the answer rank "4", and the answer rank "5" are displayed on the user terminal 3 as optional sentences.

FIG. 10B illustrates an example of the search evaluation result including high-accuracy answers. In the example of FIG. 10B, the accuracy of the answer in the answer rank "1" is "0.40", which is less than the single application threshold S1. Therefore, a response is made with the number of answers equal to or larger than the high-accuracy threshold S2. When the three accuracies in the answer ranks "1", "2", and "3" are summed up, the total accuracy is equal to or larger than the high-accuracy threshold S2 for the first time. Further, the total number of answers is three, which is equal to or less than the maximum number of answers P1. Therefore, in the first response, three answers in the answer ranks "1" "2", and "3" are displayed on the user terminal 3 as optional sentences.

In a case where the user 1 desires another answer, similarly, four answers in the answer ranks "4" to "7" whose total accuracy is equal to or larger than the high-accuracy threshold S2 for the first time are displayed on the user terminal 3 as optional sentences.

FIG. 10C illustrates an example of the search evaluation result including low-accuracy answers. In the example of FIG. 10C, the accuracy of the answer in the answer rank "1" is "0.40", which is less than the single application threshold S1. Therefore, it is determined whether or not a response can be made with the number of answers whose total accuracy is equal to or larger than the high-accuracy threshold S2.

Even when five accuracies in the answer ranks "1" to "5", which are the maximum number of answers P1, are added, the total accuracy thereof is less than the high-accuracy threshold S2. Therefore, it is determined that it is difficult to answer the question, and an answer is made to lead the user to the call center. In this example, the answer ranks "6" and "7" are not targets to be determined and may therefore be discarded.

In a case where the total accuracy is equal to or larger than the high-accuracy threshold S2 at least within the maximum number of answers P1 as in the examples of FIGS. 10A and 10B, a range of answer ranks for each response up to a predetermined number of times of response may be determined at the time of the first response. For example, in a case where the number of times of response is three times, a range of answer ranks for each response up to the third response may be determined at the time of the first response.

Figure 11:
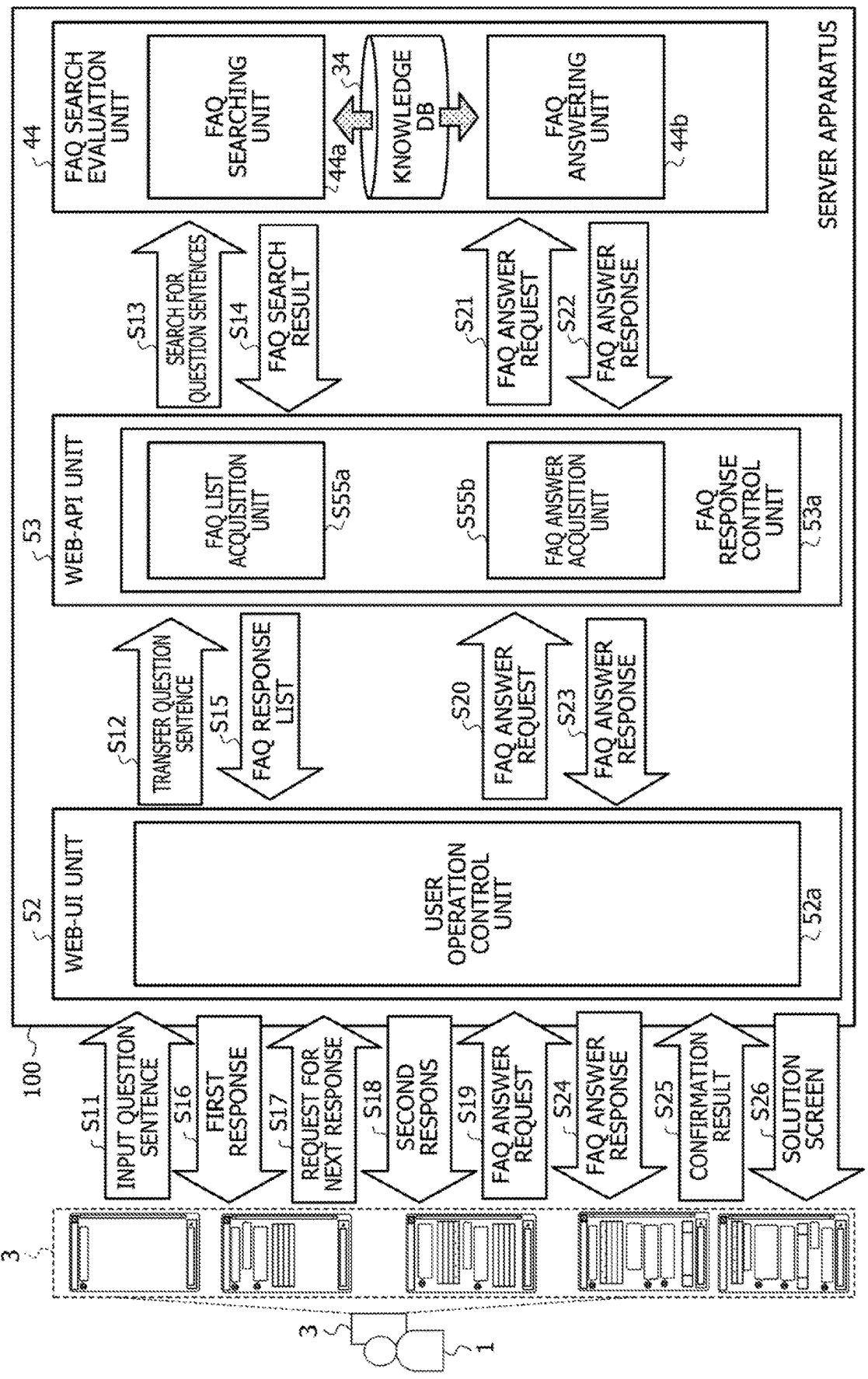
FIG. 11 is an explanatory diagram of an outline of operation of display control in this embodiment.

FIG. 11 is an explanatory diagram of an outline of operation of display control in this embodiment. Hereinafter, description will be made by using an exemplary configuration in which the FAQ response control unit 53a of the WEB-API unit 53 includes an FAQ list acquisition unit 55a and an FAQ answer acquisition unit 55b. The FAQ list acquisition unit 55a determines the number of answers and answers for specifying a question intended by the user 1. The FAQ answer acquisition unit 55b acquires an answer to the specified question intended by the user 1 from an FAQ answering unit 44b of the FAQ search evaluation unit 44.

Further, the FAQ search evaluation unit 44 includes an FAQ searching unit 44a and the FAQ answering unit 44b.

The FAQ searching unit 44a searches the knowledge DB 34 for candidate FAQ similar to the question sentence of the user 1.

In FIG. 11, when the WEB-UI unit 52 of the server apparatus 100 detects input of a question sentence on the user terminal 3 (step S11), the user operation control unit 52a transfers the question sentence to the WEB-API unit 53 (Step S12). In the WEB-API unit 53, the FAQ list acquisition unit 55a of the FAQ response control unit 53a requests the FAQ search evaluation unit 44 to search for question sentences (step S13).

In the FAQ search evaluation unit 44, the FAQ searching unit 44a searches the knowledge DB 34 for candidate FAQ similar to the question sentence, and transmits an FAQ search result showing the searched candidate FAQ to the WEB-API unit 53 (step S14). In the WEB-API unit 53, the FAQ list acquisition unit 55a notifies the WEB-UI unit 52 of an FAQ response list based on the FAQ search result (Step S15). The FAQ response list includes FAQ question sentences, FAQ response sentences, and the like.

In the WEB-UI unit 52, the user operation control unit 52a determines the number of answers and answers to be included in a response with respect to the user terminal 3 on the basis of the FAQ response list, and makes the first response to the question sentence input in step S11 (Step S16). Upon receipt of a request for the next response from the user terminal 3 (step S17), the user operation control unit 52a makes the second response on the basis of the FAQ response list (step S18).

Upon receipt of an FAQ answer request from the user terminal 3 (step S19), the user operation control unit 52a transmits the FAQ answer request to the WEB-API unit 53 (step S20). In the WEB-API unit 53, the FAQ answer acquisition unit 55b of the FAQ response control unit 53a transmits the FAQ answer request to the FAQ search evaluation unit 44 (Step S21).

In the FAQ search evaluation unit 44, the FAQ answering unit 44b uses the knowledge DB 34 to search for an answer to the question specified in the FAQ answer request, and notifies the WEB-API unit 53 of an FAQ answer response including the search result (step S22).

In the WEB-API unit 53, the FAQ answer acquisition unit 55b transmits the FAQ answer response to the WEB-UI unit 52 (step S23). In the WEB-UI unit 52, the user operation control unit 52a transmits the FAQ answer response to the user terminal 3 (step S24). Thereafter, when the WEB-UI unit 52 receives a confirmation result from the user terminal 3 (step S25), the user operation control unit 52a displays a solution screen on the user terminal 3 (step S26), and a response to the question sentence input in step S11 is terminated.

Hereinafter, details of the processing flow will be described. First, various parameters used in this embodiment will be described. FIG. 12 illustrates parameter examples. In FIG. 12, a parameter name indicates the kind of parameter, and an identifier is indicated for each parameter name. Further, as an example, FIG. 12 illustrates values of the respective parameters. However, the present invention is not limited to this example.

The parameters are the single application threshold S1, the high-accuracy threshold S2, the low-accuracy threshold S3, a determination threshold S4 for determining that a relationship is low, the maximum number of answers P1 per response, the maximum number of responses P2 before an alternative answer, and the maximum number of responses P3 after an alternative answer. First, the thresholds used for determination based on the accuracy will be described.

<Single Application Threshold S1>

In a case where the accuracy of a single FAQ is equal to or larger than the single application threshold, it is determined that the FAQ is extremely close to the question of the user, and a response is made with an answer. Only the highest FAQ is displayed on the user terminal 3. The single application threshold is, for example, "0.70".

<High-Accuracy Threshold S2>

A response is made with the number of FAQ whose total value of accuracies added in descending order is equal to or larger than the high-accuracy threshold as an answer. A plurality of FAQ is displayed to be selectable on the user terminal 3. The high-accuracy threshold is, for example, "0.95".

<Low-Accuracy Threshold S3>

In a case where the total accuracy of FAQ having the maximum number of answers (P1) per response is equal to or less than the low-accuracy threshold, it is determined that the searched FAQ deviate from the question of the user 1, and an alternative answer ("Please contact the call center.", or the like) is displayed. The low-accuracy threshold is, for example, "0.85".

<Determination Threshold S4 for Determining that Relationship is Low>

In a case where the accuracy of FAQ that has been searched for on the basis of the question sentence of the user 1 is equal to or less than the determination threshold S4, an introductory message such as "The following FAQ may be irrelevant to your question . . . " is displayed at the beginning of question sentences of the FAQ that has been searched for on the basis of the question sentence of the user 1. The message is displayed before the FAQ question sentences on the user terminal 3.

Next, description is made on display condition parameters used when a response is displayed on the user terminal 3.

<Maximum Number of Answers P1 Per Response>

The maximum number of answers displayable in a response on the user terminal 3 is indicated. The maximum number of answers per response is, for example, about three to six.

<Maximum Number of Responses P2 Before Alternative Answer>

The maximum number of responses from which the user 1 can select "Not applicable" is indicated. The maximum number of answers before an alternative answer is, for example, four times or the like. The alternative answer corresponds to the question sentences of the FAQ that have been searched for on the basis of the question sentence input by the user 1.

<Maximum Number of Responses P3 after Alternative Alternative Answer>

Even after the user 1 obtains the alternative answer (in a case where the response sentence 94c is selected on the UI screen 78 of FIG. 9), the maximum number of responses with which question sentences of low-accuracy FAQ can be referred to is indicated. The maximum number of responses is used when the question sentences of the low-accuracy FAQ are continuously displayed even after the alternative answer.

Hereinafter, a processing flow performed between the user operation control unit 52a of the WEB-UI unit 52 and the FAQ search evaluation unit 44 will be described. First, the first response processing flow in which, in response to input of a question sentence of the user 1, a response is made with question sentences of FAQ similar to the question sentence as an answer will be described with reference to FIG. 13.

Figure 13:
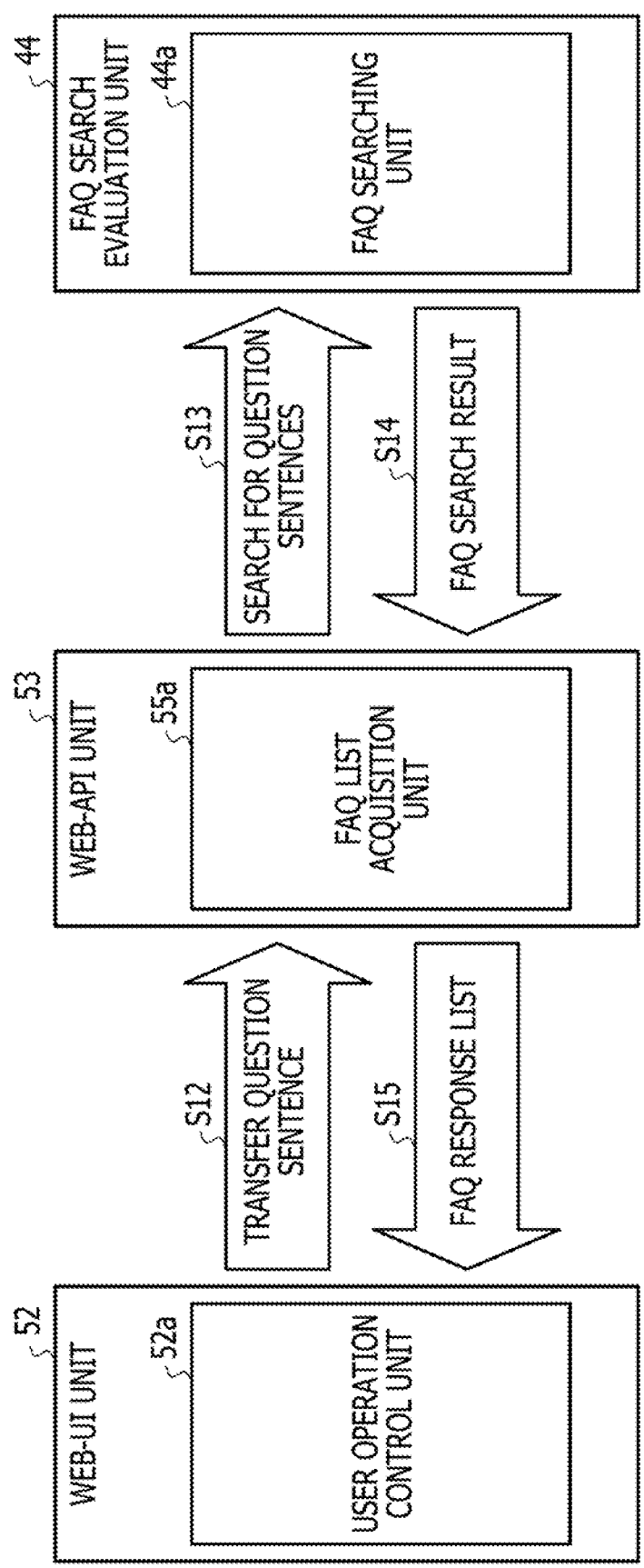
FIG. 13 illustrates an outline of first response processing.

FIG. 13 illustrates an outline of the first response processing. The first response processing in FIG. 13 corresponds to steps S12 to S15 in FIG. 11. Referring to FIG. 13, processing by the FAQ list acquisition unit 55a in the first response processing will be described with reference to FIG. 14.

Figure 14:
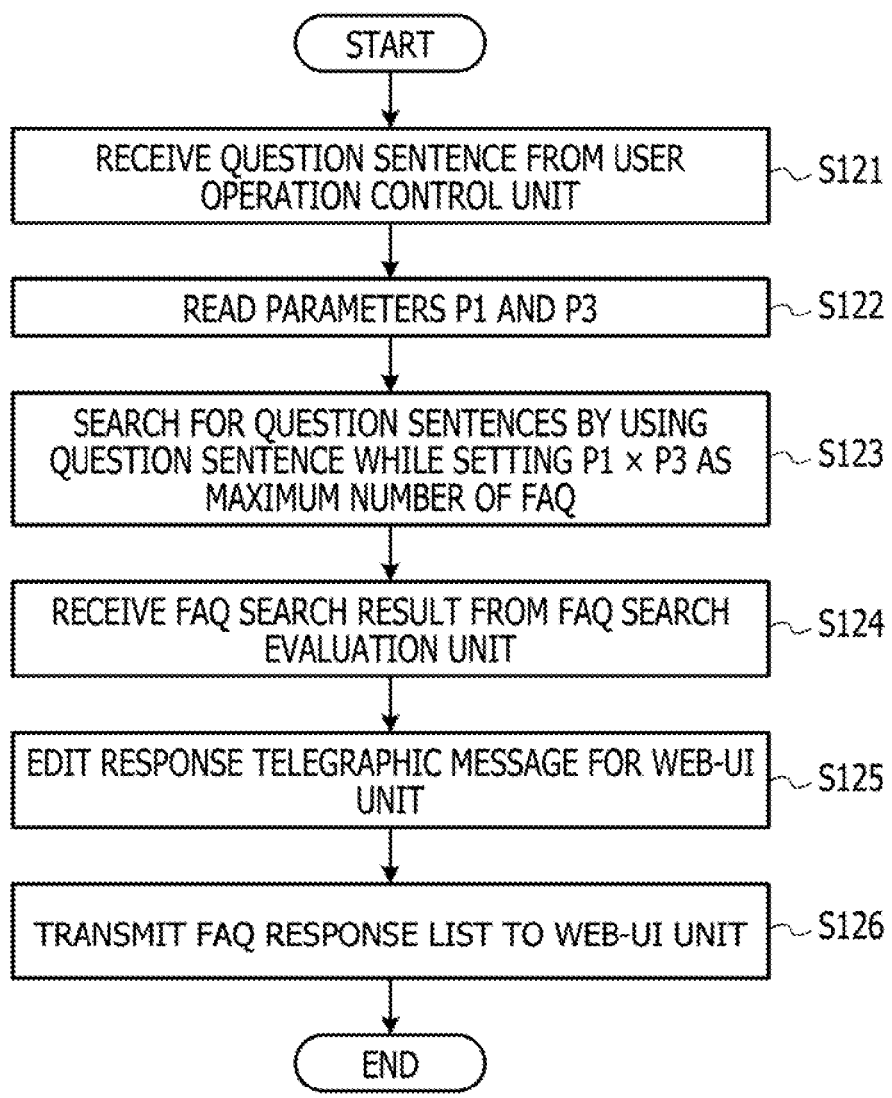
FIG. 14 is a flowchart of processing performed by an FAQ list acquisition unit.

FIG. 14 is a flowchart of processing performed by the FAQ list acquisition unit. In FIG. 14, upon receipt of a question sentence from the user operation control unit 52a of the WEB-UI unit 52 (step S121), the FAQ list acquisition unit 55a reads the parameters P1 and P3 from the storage unit 130a (step S122).

The FAQ list acquisition unit 55a requests the FAQ search evaluation unit 44 to search for question sentences by using the question sentence while setting a value obtained by multiplying P1 by P3 as the maximum number of FAQ (step S123), and receives an FAQ search result from the FAQ search evaluation unit 44 (step S124).

Then, the FAQ list acquisition unit 55a edits a response telegraphic message for the WEB-UI unit 52 (step S125), transmits an FAQ response list to the WEB-UI unit 52 (step S126), and terminates this processing.

FIGS. 15A to 15D illustrate telegraphic message examples in steps 12 to S15. FIG. 15A) illustrates an example of the transferred telegraphic message in step S12. A transferred telegraphic message 131 includes a character string "What is a procedure for changing the person in charge?" indicating the question sentence input by the user 1.

FIG. 15B illustrates an example of a search telegraphic message in step S13. A search telegraphic message 132 indicates not only the contents of the transferred telegraphic message 131 but also the maximum number of FAQ "50" obtained by multiplying P1 by P3.

FIG. 15C illustrates an example of a result telegraphic message in step S14. A result telegraphic message 133 includes descriptions 133a to 133c and the like. The description 133a indicates a session ID "20171116113533968478" used when the question sentence is transferred from the user operation control unit 52a to the FAQ list acquisition unit 55a, and the description 133b indicates that the total number of searched candidate FAQ is "20".

The description 133c indicates an FAQ question sentence in each answer rank. This example shows an FAQ question sentence "I changed the person in charge . . . ", an FAQ question sentence ID "K02-01-01", the accuracy "0.5494", and the like for the answer rank "1". This example shows an FAQ question sentence "I want to add a person in charge . . . ", an FAQ question sentence ID "K02-01-02", the accuracy "0.4667", and the like for the answer rank "2". Further, regarding the answer ranks "3" to "20", descriptions are similarly made.

FIG. 15D illustrates an example of a response list telegraphic message in step S15. A response list telegraphic message 134 includes descriptions 134a to 134c and the like. The description 134a indicates the session ID "20171116113533968478" used when the question sentence is transferred from the user operation control unit 52a to the FAQ list acquisition unit 55a, and the description 134b indicates that the total number of searched candidate FAQ is "20". The description 134c has the same contents as the description 133c, except for the answer rank.

Figure 16:
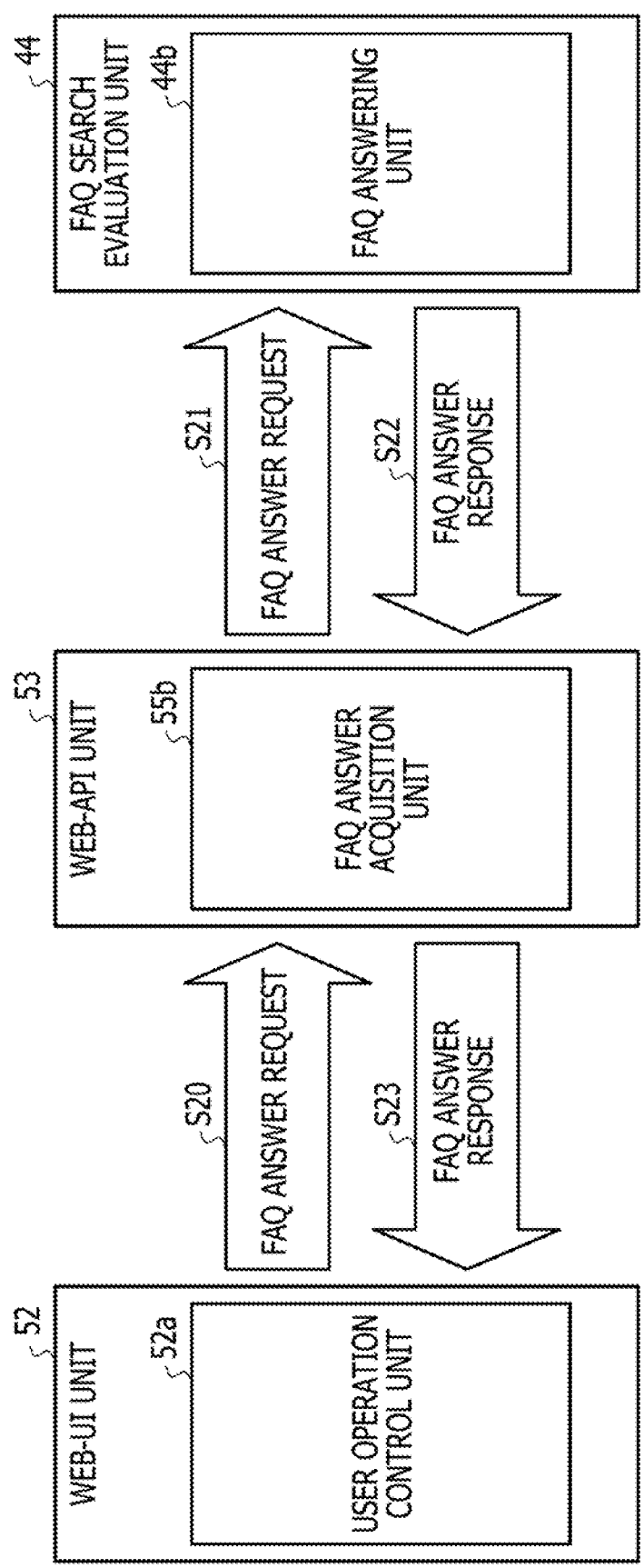
FIG. 16 illustrates an outline of second response processing.

FIG. 16 illustrates an outline of the second response processing. The second response processing in FIG. 16 corresponds to steps S20 to S23 in FIG. 11. Referring to FIG.

16, processing by the FAQ list acquisition unit 55a in the second response processing will be described with reference to FIG. 17.

Figure 17:
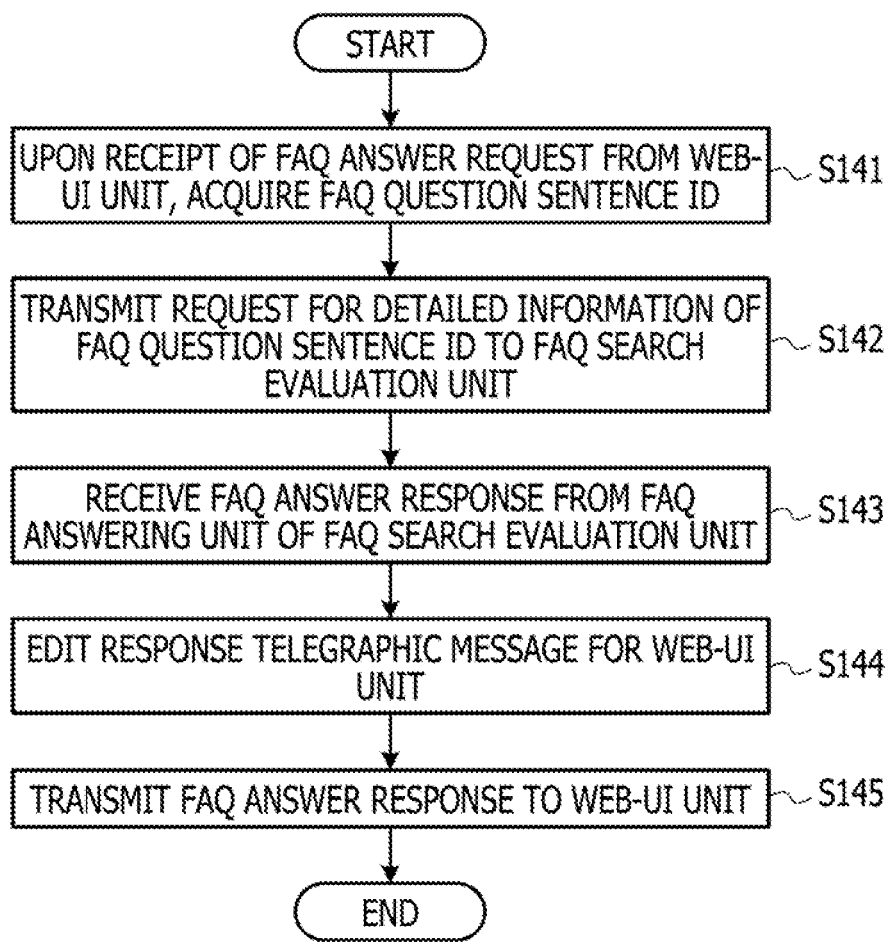
FIG. 17 is a flowchart of processing performed by an FAQ answer acquisition unit.

FIG. 17 is a flowchart of processing performed by the FAQ answer acquisition unit. In FIG. 17, upon receipt of the FAQ answer request from the user operation control unit 52a of the WEB-UI unit 52, the FAQ answer acquisition unit 55b acquires an FAQ question sentence ID (step S141), and transmits a request for detailed information of the FAQ question ID to the FAQ search evaluation unit 44 (step S142). The request for detailed information of the FAQ question ID is transmitted to the FAQ answering unit 44b via the FAQ search evaluation unit 44.

Upon receipt of the FAQ answer response from the FAQ answering unit 44b (step S143), the FAQ answer acquisition unit 55b edits a response telegraphic message for the WEB-UI unit 52 (step S144), transmits the FAQ answer response to the WEB-UI unit 52 (step S155), and terminates this processing.

FIGS. 18A to 18D illustrate telegraphic message examples in steps S20 to S23. FIG. 18A illustrates an answer request telegraphic message 151 in step S20. The answer request telegraphic message 151 includes descriptions 151a to 151c and the like. The description 151a specifies "yes" indicating that the user 1 has specified one of the candidate FAQ question sentences. The description 151b specifies an ID "K01-02-01-02" of the FAQ question sentence selected by the user 1. The description 151c specifies the session ID "20171116113533968478" for specifying the answer request telegraphic message 151.

FIG. 18B illustrates an example of an answer request telegraphic message in step S21. An answer request telegraphic message 152 includes a description 152a, a description 152b, and the like. The description 152a indicates the FAQ question sentence ID "K01-02-01-02" specified in the answer request telegraphic message 151. The description 152b indicates the session ID "20171116113533968478" in the answer request telegraphic message 151.

FIG. 18C illustrates an example of an answer response telegraphic message in step S22. An answer response telegraphic message 153 includes descriptions 153a to 153c and the like. The description 153a indicates the session ID "20171116113533968478" in the answer request telegraphic message 151. The description 153b specifies "ok" indicating that candidate FAQ have been searched for.

The description 153c indicates information regarding the FAQ question sentence in each answer rank. This example shows the FAQ question sentence ID "K02-01-01", the accuracy "0.5495", the FAQ question sentence "I want to change the person in charge . . . ", an FAQ response sentence "The person in charge of the design sheet . . . ", and the like for the answer rank "1".

FIG. 18D illustrates an example of an answer response telegraphic message in step S23. An answer response telegraphic message 154 includes descriptions 154a to 154c and the like. The description 154a indicates the session ID "20171116113533968478" in the answer request telegraphic message 151, and the description 154b specifies "ok" indicating that the candidate FAQ have been searched for.

The description 154c indicates information regarding a searched FAQ answer sentence. This example shows the FAQ question sentence ID "K02-01-01", the accuracy "0.5494", the FAQ response sentence "The person in charge of the design sheet . . . ", and the like.

Next, a processing flow in the user operation control unit 52a in the first response processing of FIG. 13 will be described. FIG. 19 is an explanatory diagram of the processing flow in the user operation control unit in the first response processing. Description will be made by using an exemplary configuration in which the user operation control unit 52a includes an input reception unit 54a, an FAQ list development unit 54b, and an FAQ display control unit 54c.

As illustrated in FIG. 19, upon receipt of data such as the question sentence input by the user 1 on the user terminal 3 (step S11), the input reception unit 54a transfers the question sentence to the WEB-API unit 53 (step S12).

When the FAQ response list is provided from the FAQ list acquisition unit 55a of the WEB-API unit 53 (step S15), the FAQ list development unit 54b develops the FAQ response list in the primary storage 12a.

The FAQ display control unit 54c determines the number of FAQ question sentences to be included in a response and the FAQ question sentences by using the FAQ response list stored in the primary storage 12a, and performs display control of displaying the response on the user terminal 3 (step S16). The first response is made. Thereafter, the display control described with reference to FIG. 11 is performed by the FAQ display control unit 54c.

FIG. 20 illustrates an exemplary data structure of the FAQ response list. An FAQ response list 201 in FIG. 20 is a table showing candidate FAQ searched for on the basis of the question sentence input by the user 1. The FAQ response list 201 includes items such as answer rank, FAQ question sentence ID, FAQ question sentence, accuracy, and response number.

The answer rank indicates descending order of accuracy. The FAQ question sentence ID indicates an ID for identifying an FAQ question sentence. The FAQ question sentence indicates the content of the question sentence of each of the candidate FAQ. The accuracy indicates a degree of similarity to the question sentence input by the user 1. The response number is set by the FAQ display control unit 54c and indicates the determined response number. This example shows a state in which the response number has not been set yet.

Figure 21:
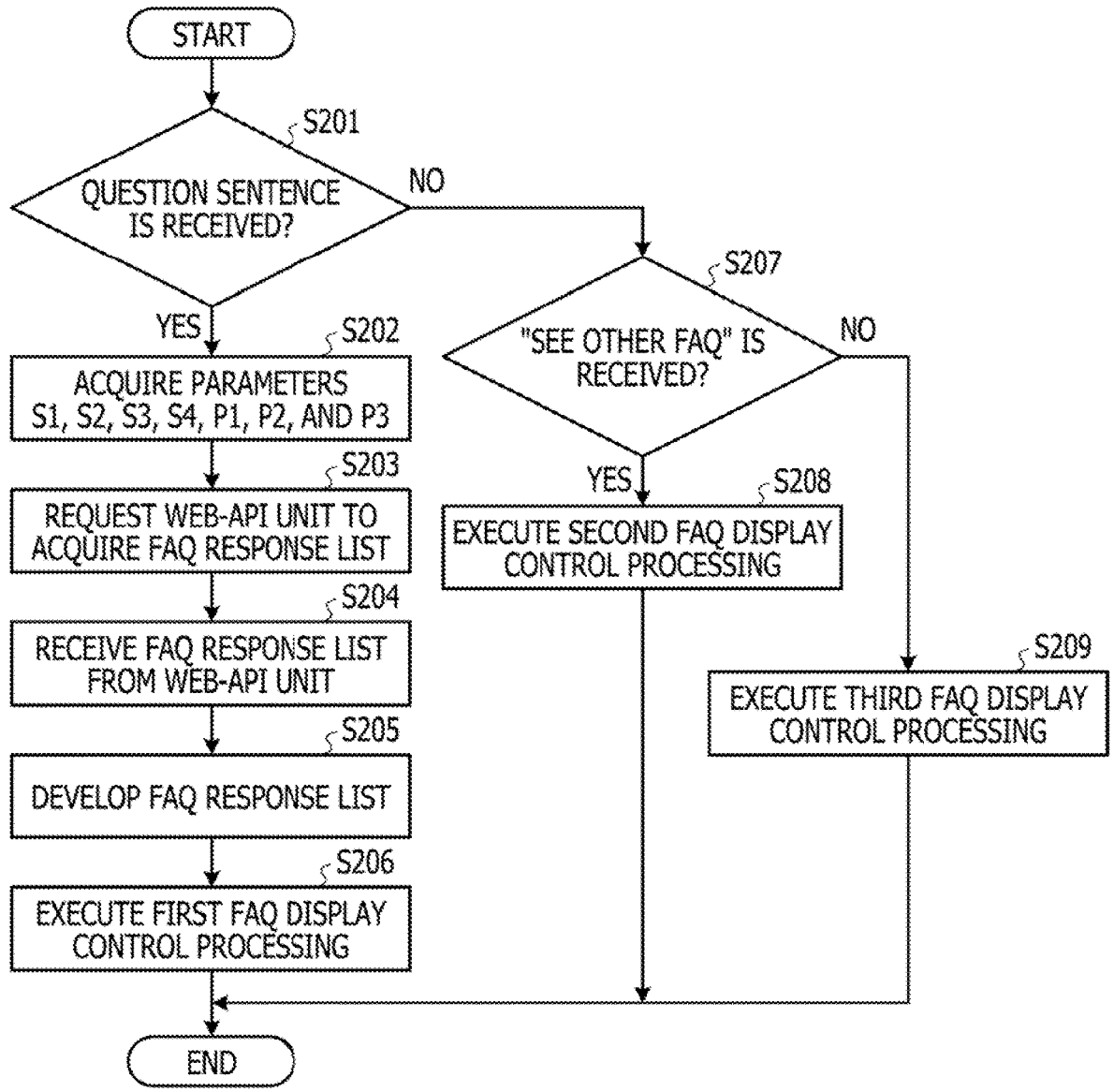
FIG. 21 is a flowchart of overall processing performed by a user operation control unit of a WEB-UI unit.

FIG. 21 is a flowchart of overall processing performed by the user operation control unit of the WEB-UI unit. In FIG. 21, in the user operation control unit 52a, the input reception unit 54a determines whether or not a question sentence has been received from the user terminal 3 (step S201). In a case where the question sentence is received (YES in step S201), the input reception unit 54a determines that this is the first FAQ display control, acquires the parameters S1, S2, S3, S4, P1, P2, and P3 from the storage unit 130a, and stores the parameters in the primary storage 12a (step S202). Then, the input reception unit 54a transfers the received question sentence to the WEB-API unit 53 to make a request to acquire an FAQ response list (step S203).

When the user operation control unit 52a receives the FAQ response list from the WEB-API unit 53 (step S204), the FAQ list development unit 54b develops the FAQ response list in the primary storage 12a (step S205). Then, the FAQ display control unit 54c performs the first FAQ display control processing (step S206). Then, the processing by the user operation control unit 52a is terminated.

Meanwhile, in a case where the question sentence has not been received (NO in step S201), the input reception unit 54a determines whether or not "See other FAQ" has been received (step S207). In a case where "See other FAQ" is received (YES in step S207), the input reception unit 54a directly calls the FAQ display control unit 54c without transferring "See other FAQ" to the WEB-API unit 53, and executes the second FAQ display control processing (step S208). Thereafter, the processing by the user operation control unit 52a is terminated.

Meanwhile, in a case where "See other FAQ" has not been received (NO in step S207), the input reception unit 54a directly calls the FAQ display control unit 54c without transferring "See other FAQ" to the WEB-API unit 53, and executes the third FAQ display control processing that is performed in response to reception of "Not applicable" (step S209). Thereafter, the processing by the user operation control unit 52a is terminated.

Figure 22:
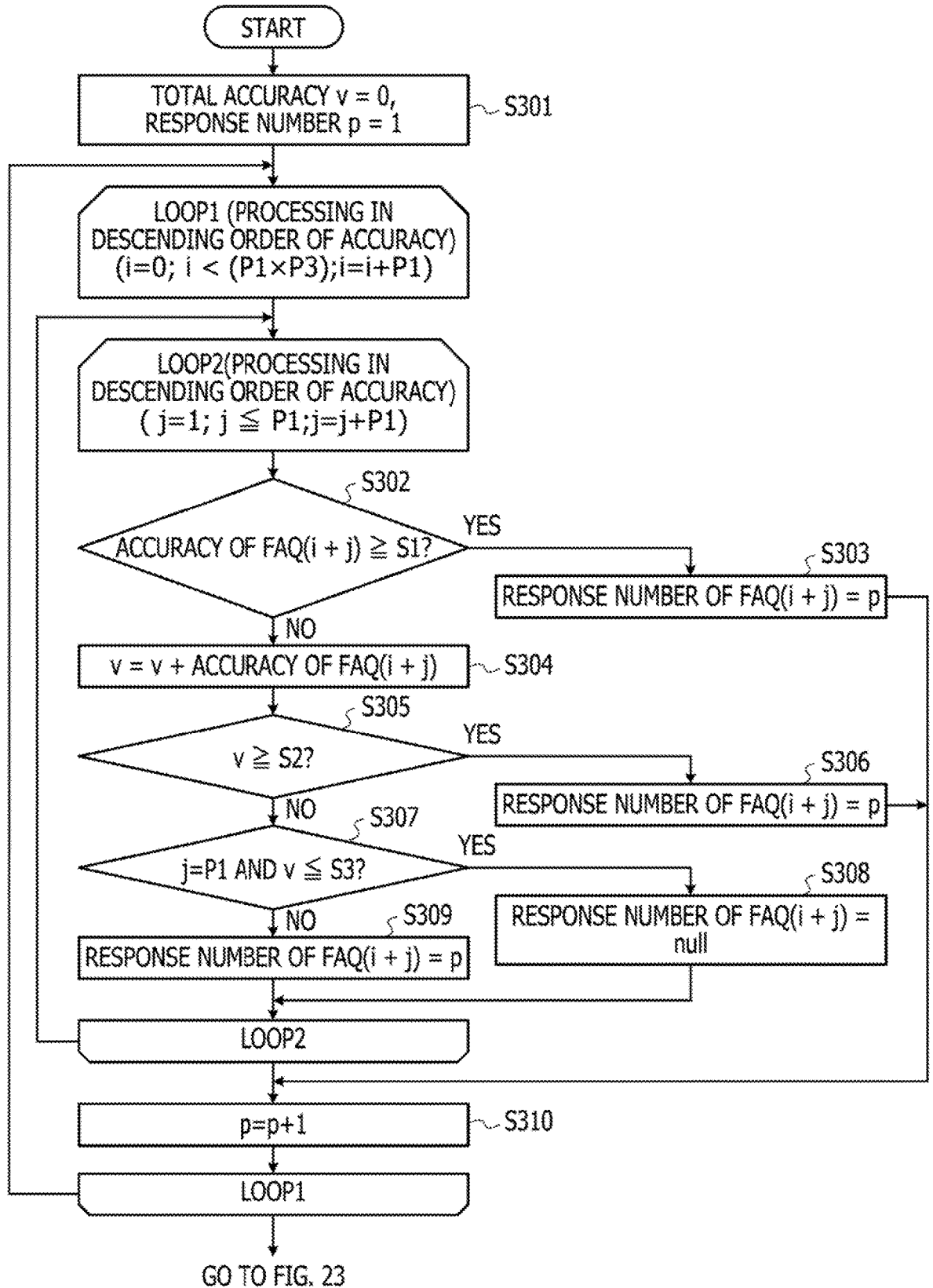
FIG. 22 is a flowchart of first FAQ display control processing performed by an FAQ display control unit.
Figure 23:
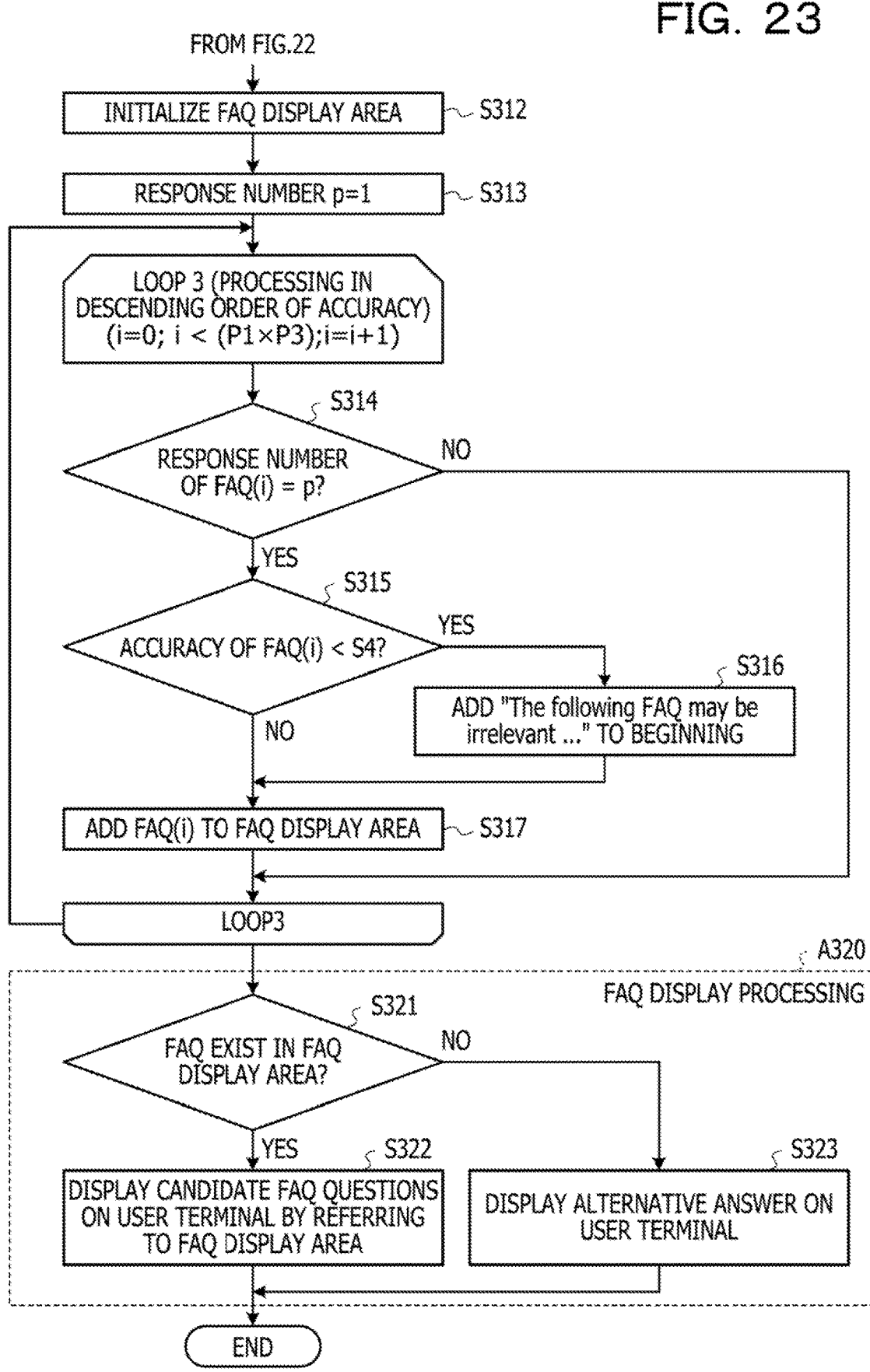
FIG. 23 is a flowchart of the first FAQ display control processing performed by an FAQ display control unit.

FIGS. 22 and 23 are flowcharts of the first FAQ display control processing performed by the FAQ display control unit. In FIG. 22, processing of setting a value to the response number in the FAQ response list is performed. The number of FAQ question sentences to be included in each response and the FAQ question sentences are determined. The FAQ display control unit 54c sets 0 to a total accuracy v indicating the sum total of accuracies selected from the FAQ response list, and sets 1 to a response number p (step S301).

The FAQ display control unit 54c performs processing of a loop 1. In the loop 1, processing of summing up accuracies in descending order of accuracy in the FAQ response list is performed. The FAQ display control unit 54c sets 0 as an initial value of a counter i, and, in a case where the counter i is equal to or less than the value of P1×P3, adds P1 to the counter i and repeats the loop 1.

In the loop 1, the FAQ display control unit 54c further performs processing of a loop 2. In the loop 2, display control processing for each response is performed. The FAQ display control unit 54c sets 1 as an initial value of a counter j, and, in a case where the counter j is equal to or less than P1, increments the counter J by 1 and repeats the loop 2. Hereinafter, FAQ(i+j) indicates an answer rank that is currently processed in the FAQ response list and specifies a record.

The FAQ display control unit 54c determines whether or not the accuracy of FAQ(i+j) is equal to or larger than the single application threshold S1 (Step S302). In a case where the accuracy is equal to or larger than the single application threshold S1 (YES in step S302), the FAQ display control unit 54c sets p to the response number of FAQ(i+j) (step S303), and proceeds to step S310.

Meanwhile, in a case where the accuracy is less than the single application threshold S1 (NO in step S302), the FAQ display control unit 54c adds the accuracy of FAQ(i+j) to the total accuracy v (step S304), and determines whether or not the total accuracy v is equal to or larger than the high-accuracy threshold S2 (step S305). In a case where the accuracy is equal to or larger than the high-accuracy threshold S2 (YES in step S305), the FAQ display control unit 54c sets p to the response number of FAQ(i+j) (step S306), and proceeds to step S310.

Meanwhile, in a case where the accuracy is less than the high-accuracy threshold S2 (NO in step S305), the FAQ display control unit 54c determines whether or not the counter j is the maximum number of answers P1 per response and whether or not the total accuracy v is equal to or less than the low-accuracy threshold S3 (step S307). In a case where the total accuracy v is equal to or less than the low-accuracy threshold S3 (YES in step S307), the FAQ display control unit 54c sets null to the response number of FAQ(i+j) (step S308), and repeats the loop 2 until the counter j becomes larger than the maximum number of answers P1 per response.

Meanwhile, in a case where the total accuracy v is larger than the low-accuracy threshold S3 (NO in step S307), the FAQ display control unit 54c sets p to the response number of FAQ(i+j) (step S309), and repeats the loop 2 until the counter J becomes larger than the maximum number of answers P1 per response.

When the counter j becomes larger than the maximum number of answers P1 per response, the FAQ display control unit 54c increments the response number p by 1 (step S310), and repeats the loop 1 while adding P1 to the counter i until the counter i becomes equal to or larger than the value of P1×P3. When the counter i becomes equal to or larger than the value of P1×P3, the FAQ display control unit 54c terminates the loop 1, and proceeds to step S312 in FIG. 23. Steps S312 to S317 in FIG. 23 and FAQ display processing A320 correspond to the first FAQ display control.

In FIG. 23, the FAQ display control unit 54c initializes an FAQ display area (Step S312), sets 1 to the response number p (Step S313), and performs processing of a loop 3. In the loop 3, FAQ for the first response are extracted from the FAQ response list in descending order of accuracy. The FAQ display control unit 54c sets 0 as the initial value of the counter i, and, in a case where the counter i is equal to or less than the value of P1×P3, increments the counter i by 1 and repeats the loop 3. Hereinafter, FAQ(i) specifies the i-th record in descending order of accuracy in the FAQ response list.

The FAQ display control unit 54c determines whether or not the response number of FAQ(i) matches p (step S314). In a case where the response number of FAQ(i) does not match p (NO in step S314), the FAQ display control unit 54c repeats the loop 3 until the counter i becomes equal to or larger than the value of P1×P3.

In a case where the response number of FAQ(i) matches p (YES in step S314), the FAQ display control unit 54c determines whether or not the accuracy of FAQ(i) is less than the determination threshold S4 for determining that a relationship is low (step S315). In a case where the accuracy is less than the determination threshold S4 (YES in step S315), the FAQ display control unit 54c adds a sentence "The following FAQ may be irrelevant . . . " to the beginning of the FAQ question sentences (step S316), and adds FAQ(i) to the FAQ display area (step S317). Then, the FAQ display control unit 54c repeats the loop 3 until the counter i becomes equal to or larger than the value of P1×P3.

In a case where the accuracy is equal to or larger than the determination threshold S4 (NO in step S315), the FAQ display control unit 54c adds FAQ(i) to the FAQ display area (step S317), and repeats the loop 3 until the counter i becomes equal to or larger than the value of P1×P3.

When the counter i becomes equal to or larger than the value of P1×P3, the FAQ display control unit 54c terminates the loop 3 and performs the FAQ display processing A320. In the FAQ display processing A320, it is determined whether or not FAQ exists in the FAQ display area (step S321). In a case where FAQ exists (YES in step S321), the FAQ display control unit 54c displays candidate FAQ questions on the user terminal 3 by referring to the FAQ display area (step S322), and terminates the FAQ display processing A320. Meanwhile, in a case where no FAQ exists (NO in step S321), the FAQ display control unit 54c displays an alternative answer on the user terminal 3 (step S323), and terminates the FAQ display processing A320. After the FAQ display processing A320 is terminated, the FAQ display control unit 54c terminates the first FAQ display control.

Figure 24:
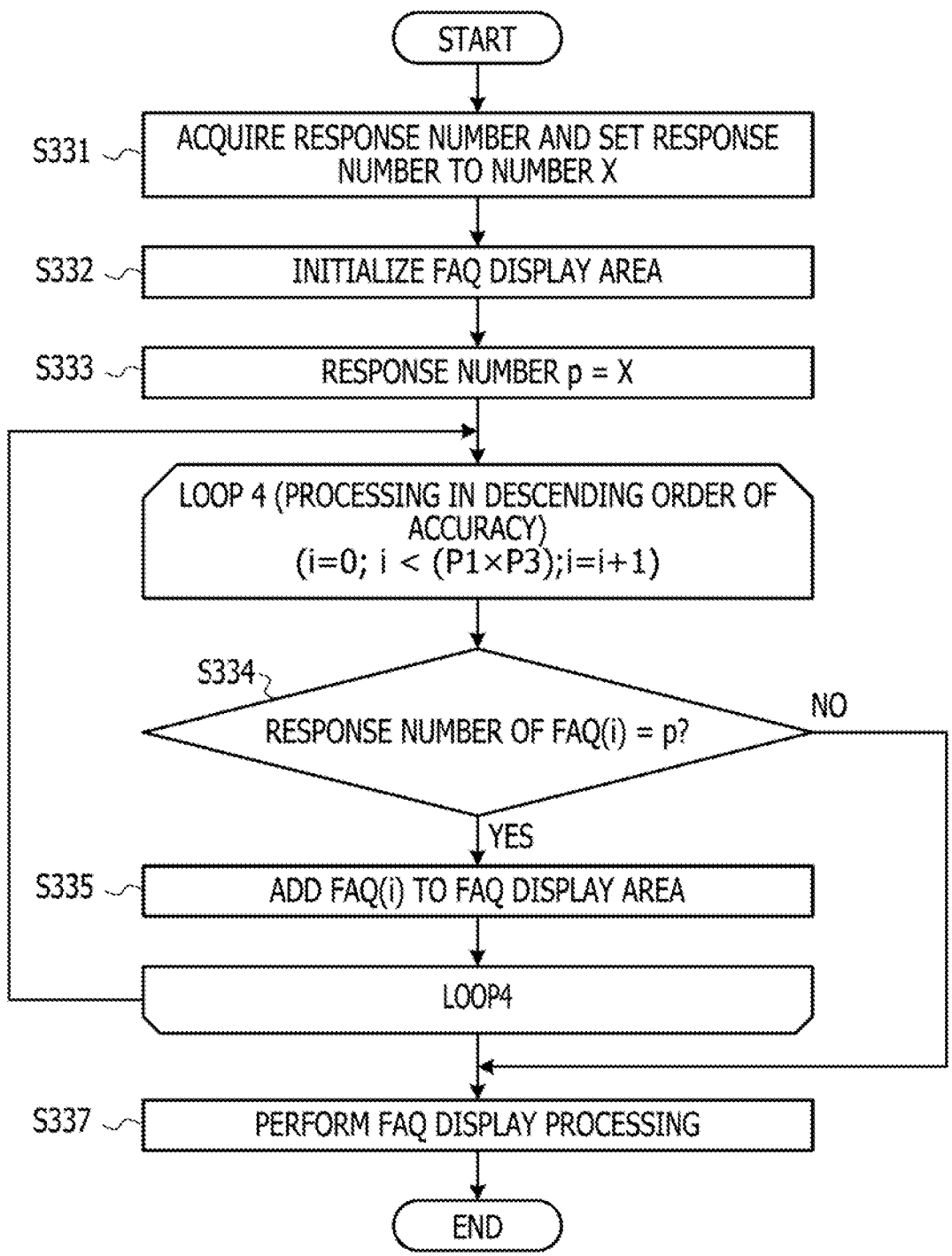
FIG. 24 is a flowchart of second FAQ display control processing performed by an FAQ display control unit.

FIG. 24 is a flowchart of the second FAQ display control processing performed by the FAQ display control unit. In the second FAQ display control processing, FAQ display control in the second and subsequent responses, which is performed in response to reception of "See other FAQ", is performed.

As illustrated in FIG. 24, the FAQ display control unit 54c acquires the response number, sets the response number to the number X (step S331), and initializes the FAQ display area (step S332). Further, the FAQ display control unit 54c sets the number X to the response number p (step S333), and performs processing of a loop 4. In the loop 4, processing of extracting, from the FAQ response list, FAQ whose response numbers p indicate X in descending order of accuracy is performed. The FAQ display control unit 54c sets 0 as the initial value of the counter i, and, in a case where the counter i is equal to or less than the value of P1×P3, increments the counter i by 1 and repeats the loop 4.

The FAQ display control unit 54c determines whether or not the response number of FAQ(i) matches p (step S334). In a case where the response number of FAQ(i) does not match p (NO in step S334), the FAQ display control unit 54c exits from the loop 4 and performs the FAQ display processing A320 (FIG. 23) (step S337). When the FAQ display processing A320 (FIG. 23) is terminated, the FAQ display control unit 54c terminates the second FAQ display control processing.

Meanwhile, the response number of FAQ(i) matches p (YES in step S334), and the FAQ display control unit 54c adds FAQ(i) to the FAQ display area (step S335). The FAQ display control unit 54c repeats the loop 4 while adding P1 to the counter i until the counter i becomes equal to or larger than the value of P1×P3. When the counter i becomes equal to or larger than the value of P1×P3, the FAQ display control unit 54c terminates the loop 4, performs the FAQ display processing A320 (FIG. 23), and then terminates the second FAQ display control processing.

Figure 25:
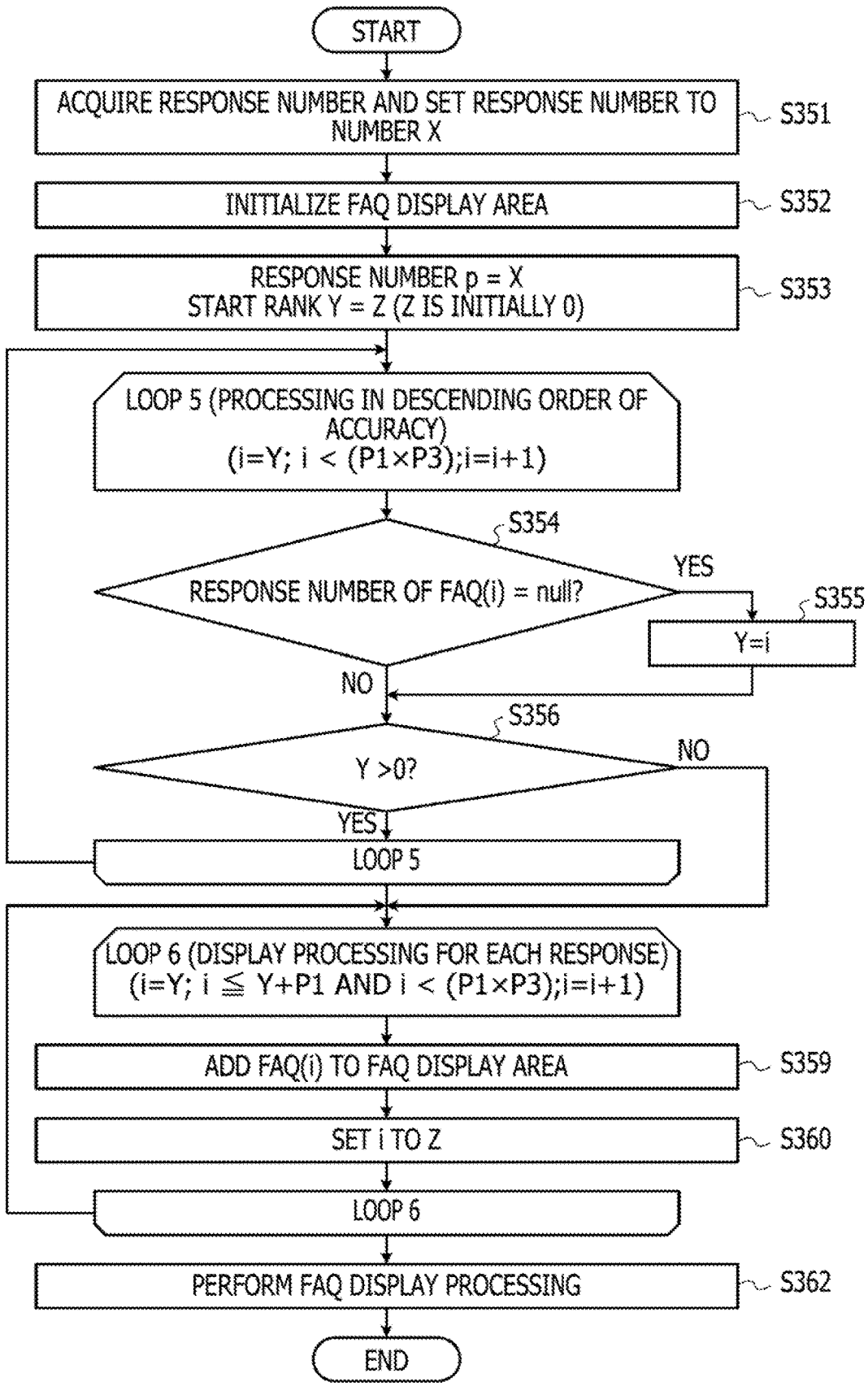
FIG. 25 is a flowchart of third FAQ display control processing performed by an FAQ display control unit.

FIG. 25 is a flowchart of the third FAQ display control processing performed by the FAQ display control unit. In the third FAQ display control processing, FAQ display control, which is performed in response to reception of "Not applicable", is performed.

As illustrated in FIG. 25, the FAQ display control unit 54c acquires the response number, sets the response number to the number X (step S351), and initializes the FAQ display area (step S352). Further, the FAQ display control unit 54c sets the number X to the response number p, sets Z to a start rank Y (step S353), and performs processing of a loop 5. Z is initially zero. In the loop 5, processing of summing up accuracies in descending order of accuracy in the FAQ response list is performed. The FAQ display control unit 54c sets 0 as the initial value of the counter i, and, in a case where the counter i is equal to or less than the value of P1×P3, increments the counter i by 1 and repeats the loop 5.

The FAQ display control unit 54c determines whether or not the response number of FAQ(i) is null (step S354). In this determination processing in step S354, it is determined whether or not FAQ are only low-accuracy FAQ. In a case where the response number of FAQ(i) is null (YES in step S354), the FAQ display control unit 54c sets the counter i to the start rank Y (step S355), and then determines whether or not the start rank Y is larger than zero (step S356). In a case where the start rank Y is equal to or less than zero (NO in step S356), the FAQ display control unit 54c exits from the loop 5 and starts a loop 6.

Meanwhile, in a case where the start rank Y is larger than zero (YES in step S356), the FAQ display control unit 54c repeats the loop 5 until the counter i becomes equal to or larger than the value of P1×P3.

When the loop 5 is terminated, the FAQ display control unit 54c performs processing of the loop 6. In the loop 6, display processing for each response is performed. The FAQ display control unit 54c sets the start position Y to the counter i, and, in a case where the counter i is equal to or less than Y+P1 and is less than P1×P3, increments the counter i by 1 and repeats the loop 6.

The FAQ display control unit 54c adds FAQ(i) to the FAQ display area (step S359), sets the counter i to Z (step S360), and performs similar processing while the above-described repetition condition for the loop 6 is satisfied. When the loop 6 is terminated, Z indicates a start rank for the next response.

When the loop 6 is terminated, the FAQ display control unit 54c performs the FAQ display processing A320 (step S362), and then terminates the third FAQ display control processing.

Next, this embodiment supports at least the following operations:

Operation 1: Display control performed in a case where an extremely high accuracy answer (FAQ question sentence) exists;

Operation 2: Display control performed in a case where high accuracy answers (FAQ question sentences) exist;

Operation 3: Display control performed in a case where moderate accuracy answers (FAQ question sentences) exist as a whole;

Operation 4: Display control performed in a case where low accuracy answers (FAQ question sentences) exist as a whole;

Operation 5: Display control performed in a case where it is difficult to answer a question;

and the like. Display control in each of Operations 1 to 5 will be described. In the following description, the parameter examples in FIG. 12 are used. Further, it is assumed that twenty FAQ are searched for by the FAQ searching unit 44a.

FIG. 26 illustrates exemplary data of a table regarding the display control in Operation 1. In FIG. 26, a table 201-1 is a data table showing results of the display control in Operation 1. The table 201-1 shows a data example of items such as determination result, in addition to the items of the FAQ response list 201 of FIG. 20. The item of FAQ question sentence is omitted. The determination result indicates a total value of accuracies in the display control. In FIG. 26, remarks are additionally provided.

Referring to the table 201-1, the accuracy in the answer rank "1" is "0.7546", and thus the accuracy of the FAQ question sentence in the answer rank "1" alone is equal to or larger than the single application threshold S1. Thus, only this FAQ question sentence is included. The response number "1" is set for the answer rank "1".

Then, the accuracy in the answer rank "2" is "0.1033", which is less than the single application threshold S1 and the high-accuracy threshold S2. Thus, the accuracies in the subsequent answer ranks "3" to "6" are added until the accuracies become the high-accuracy threshold S2 within the limits of the maximum number of times P1 per response. The determination result "0.4925" is less than the low-accuracy threshold S3, and thus it is determined that a response including FAQ question sentences is not made. Therefore, the response number null is set to the answer ranks "3" to "6". Further, the response number null is also set to the answer ranks "7" to "20" indicating low accuracy. Based on the table 201-1 created in this way, display control on the user terminal 3 is performed.

Figure 27:
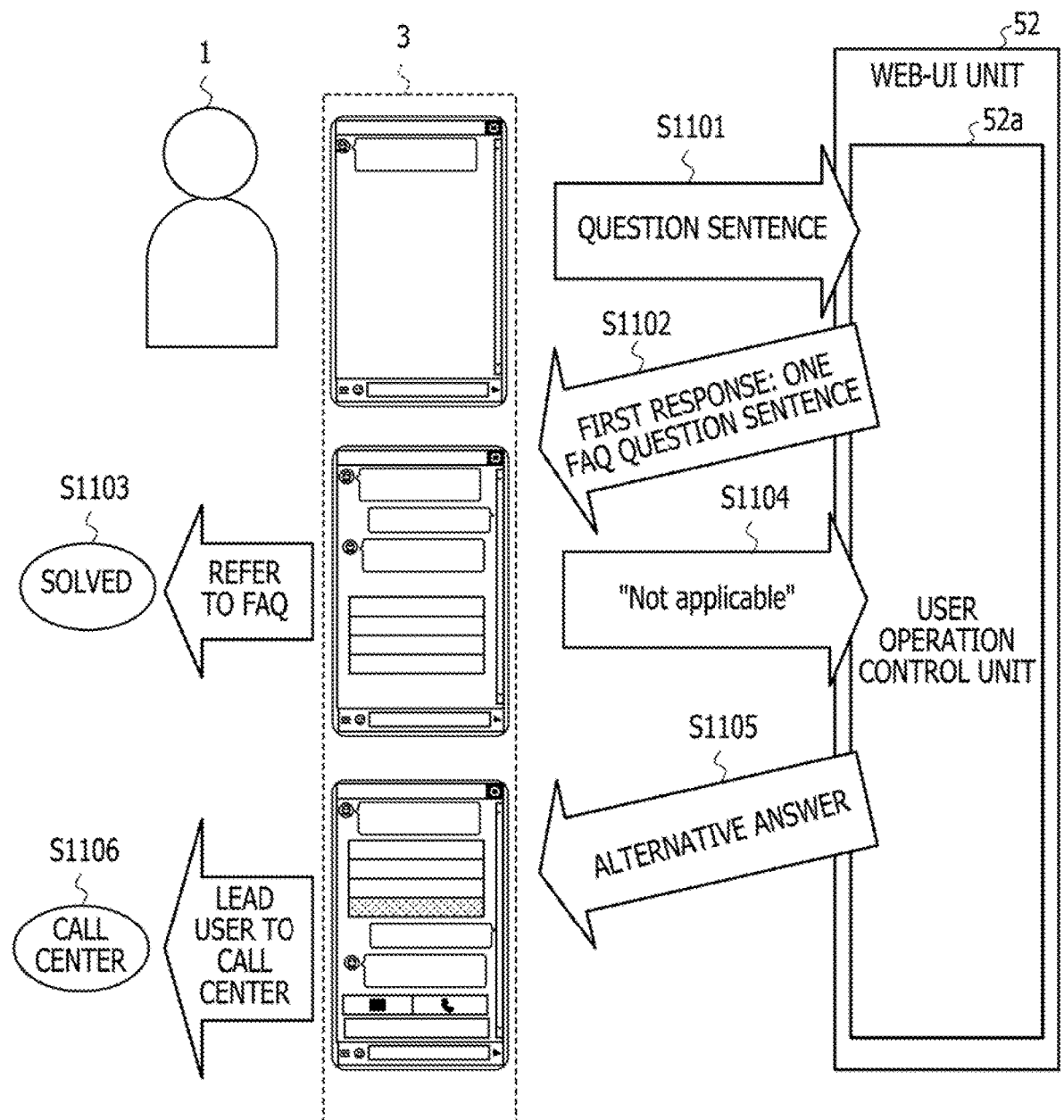
FIG. 27 illustrates an exemplary processing flow between a user terminal and a server apparatus according to Operation 1.

FIG. 27 illustrates an exemplary processing flow between the user terminal and the server apparatus according to Operation 1. As illustrated in FIG. 27, in the server apparatus 100, upon receipt of a question sentence from the user terminal 3 (step S1101), the user operation control unit 52a of the WEB-UI unit 52 acquires the FAQ response list 201 in which candidate FAQ similar to the question sentence are sorted in order of accuracy from the FAQ searching unit 44*a* via the WEB-API unit 53.

The user operation control unit 52*a* creates the table 201-1 (FIG. 26) in the storage unit 130*a* on the basis of the FAQ response list 201, includes the FAQ question sentence of the response number "1" in the first response, transmits the first response to the user terminal 3, and displays the first response on the user I/F 16*b* (step S1102).

In a case where an answer displayed as the first response displayed on the user terminal 3 corresponds to the intended question, the user 1 selects the displayed FAQ question sentence, and thus an FAQ response sentence is displayed on the user terminal 3. Therefore, the question of the user 1 is solved (step S1103). Meanwhile, when the user 1 determines that the answer displayed as the displayed first response does not correspond to the intended question sentence and selects "Not applicable", a telegraphic message indicating "Not applicable" is transmitted to the server apparatus 100 (step S1104).

In the server apparatus 100, upon receipt of the telegraphic message indicating "Not applicable", the user operation control unit 52*a* refers to the table 201-1 to search for a record indicating the response number "2". No record indicating the response number "2" exists in the table 201-1, and thus an alternative answer for leading the user to the call center is transmitted to the user terminal 3 as a response (step S1105). When the alternative answer is displayed on the user terminal 3 (step S1106), the user 1 can obtain inquiry means to the call center.

FIG. 28 illustrates exemplary data of a table regarding the display control in Operation 2. In FIG. 28, a table 201-2 is a data table showing results of the display control in Operation 2. The table 201-2 shows exemplary data of items similar to those of the table 201-1 in FIG. 26.

Referring to the table 201-2, the accuracy in the answer rank "1" is "0.5494", which is less than the single application threshold S1, and the accuracy "0.4667" in the answer rank "2" is added. Thus, "1.0161" is obtained. The total accuracy "1.0161" is equal to or larger than the high-accuracy threshold S2, and thus "1" is set to the response numbers in the answer ranks "1" and "2" so that the FQA question sentences in the answer ranks "1" and "2" are included in the first response.

In a case where the accuracies are added according to the answer ranks from the answer rank "3" to the maximum number of times P1 per response, "0.9695" is obtained when the accuracy in the answer rank "6" is added. The total accuracy "0.9695" is equal to or larger than the high-accuracy threshold S2, and thus the FQA question sentences in the answer ranks "3" to "6" are included in the second response. Therefore, "2" is set to the response numbers in the answer ranks "3" to "6".

Similarly, when the answer ranks "7" to "11" are added, "1.0527" is obtained. The total accuracy "1.0527" is equal to or larger than the high-accuracy threshold S2, and thus "3" is set to the response numbers in the answer ranks "7" to "11" so that the FQA question sentences in the answer ranks "7" to "11" are included in the third response.

Further, when the answer ranks "12" to "16" are added, "0.8259" is obtained. The total accuracy "0.8259" is equal to or less than the low-accuracy threshold S3, and thus "null" is set to the response numbers in the answer ranks "12" to "16". In the fourth response, an alternative answer is included in a response and is displayed on the user terminal 3.

Figure 29:
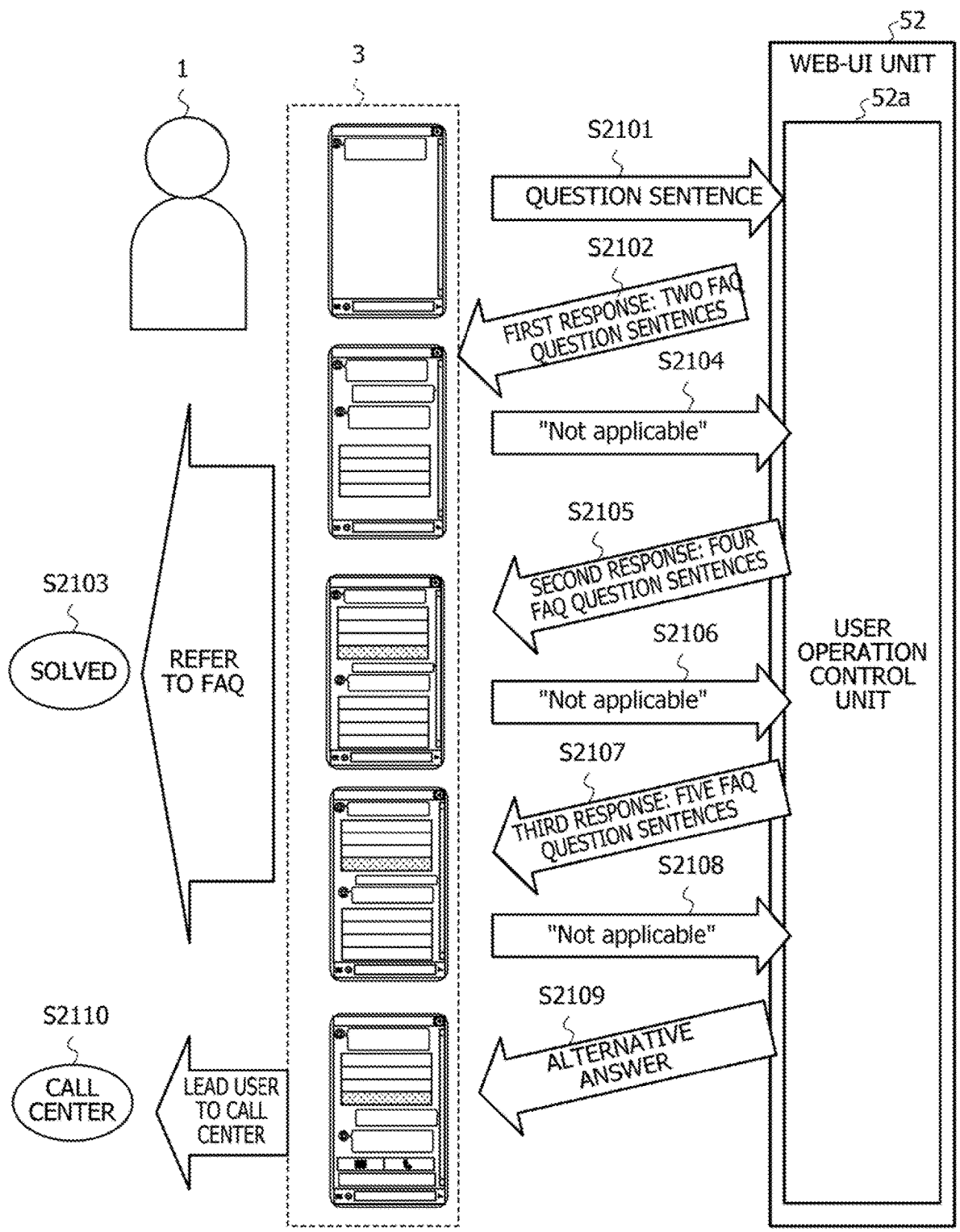
FIG. 29 illustrates an exemplary processing flow between a user terminal and a server apparatus according to Operation 2.

FIG. 29 illustrates an exemplary processing flow between the user terminal and the server apparatus according to Operation 2. As illustrated in FIG. 29, in the server apparatus 100, upon receipt of a question sentence from the user terminal 3 (step S2101), the user operation control unit 52*a* of the WEB-UI unit 52 acquires the FAQ response list 201 in which candidate FAQ similar to the question sentence are sorted in order of accuracy from the FAQ searching unit 44*a* via the WEB-API unit 53.

The user operation control unit 52*a* creates the table 201-2 (FIG. 28) in the storage unit 130*a* on the basis of the FAQ response list 201, includes the FAQ question sentences of the response number "1" in the first response, transmits the first response to the user terminal 3, and displays the first response on the user I/F 16*b* (step S2102).

In a case where any of answers displayed as the first response displayed on the user terminal 3 corresponds to the intended question, the user 1 selects one of the displayed FAQ question sentences, and thus an FAQ response sentence is displayed on the user terminal 3. Therefore, the question of the user 1 is solved (step S2103). Meanwhile, when the user 1 determines that the answers displayed as the displayed first response do not correspond to the intended question sentence and selects "Not applicable", a telegraphic message indicating "Not applicable" is transmitted to the server apparatus 100 (step S2104).

In the server apparatus 100, upon receipt of the telegraphic message indicating "Not applicable", the user operation control unit 52*a* refers to the table 201-2 to search for a record indicating the response number "2". In the table 201-2, the FAQ question sentences of the response number "2" are included in the second response, are transmitted to the user terminal 3, and are displayed on the user I/F 16*b* (step S2105).

In a case where any of answers displayed as the second response displayed on the user terminal 3 corresponds to the intended question, the user 1 selects one of the displayed FAQ question sentences, and thus an FAQ response sentence is displayed on the user terminal 3. Therefore, the question of the user 1 is solved (step S2103). Meanwhile, when the user 1 determines that the answers displayed as the displayed second response do not correspond to the intended question sentence and selects "Not applicable", a telegraphic message indicating "Not applicable" is transmitted to the server apparatus 100 (step S2106).

In the server apparatus 100, upon receipt of the telegraphic message indicating "Not applicable", the user operation control unit 52*a* refers to the table 201-2 to search for a record indicating the response number "3". In the table 201-2, the FAQ question sentences of the response number "3" are included in the third response, are transmitted to the user terminal 3, and are displayed on the user I/F 16*b* (step S2107).

In a case where any of answers displayed as the third response displayed on the user terminal 3 corresponds to the intended question, the user 1 selects one of the displayed FAQ question sentences, and thus an FAQ response sentence is displayed on the user terminal 3. Therefore, the question of the user 1 is solved (step S2103). Meanwhile, when the user 1 determines that the answers displayed as the displayed third response do not correspond to the intended question sentence and selects "Not applicable", a telegraphic message indicating "Not applicable" is transmitted to the server apparatus 100 (step S2108).

In the server apparatus 100, upon receipt of the telegraphic message indicating "Not applicable", the user operation control unit 52*a* refers to the table 201-2 to search for a record indicating the response number "4". No record indicating the response number "4" exists in the table 201-2, and thus an alternative answer for leading the user to the call center is transmitted to the user terminal 3 as a response (step S2109). When the alternative answer is displayed on the user terminal 3 (step S2110), the user 1 can obtain inquiry means to the call center.

FIG. 30 illustrates exemplary data of a table regarding the display control in Operation 3. In FIG. 30, a table 201-3 is a data table showing results of the display control in Operation 2. The table 201-3 shows exemplary data of items similar to those of the table 201-1 in FIG. 26.

Referring to the table 201-3, the accuracy in the answer rank "1" is "0.5188", which is less than the single application threshold S1, and is added with the accuracy "0.4967" in the answer rank "2". Thus, "1.0155" is obtained. The total accuracy "1.0155" is equal to or larger than the high-accuracy threshold S2, and thus "1" is set to the response numbers in the answer ranks "1" and "2" so that the FQA question sentences in the answer ranks "1" and "2" are included in the first response.

In a case where the accuracies are added according to the answer ranks from the answer rank "3" to the maximum number of times P1 per response, "1.1718" is obtained when the accuracy in the answer rank "5" is added. The total accuracy "1.1718" is equal to or larger than the high-accuracy threshold S2, and thus "2" is set to the response numbers in the answer ranks "3" to "5" so that the FQA question sentences in the answer ranks "3" to "5" are included in the second response.

Similarly, when the answer ranks "6" to "9" are added, "1.1789" is obtained. The total accuracy "1.1789" is equal to or larger than the high-accuracy threshold S2, and thus "3" is set to the response numbers in the answer ranks "6" to "9" so that the FQA question sentences in the answer ranks "6" to "9" are included in the third response.

Similarly, when the answer ranks "10" to "14" are added, "0.8848" is obtained. The total accuracy "0.8848" is equal to or larger than the high-accuracy threshold S2, and thus "4" is set to the response numbers in the answer ranks "10" to "14" so that the FQA question sentences in the answer ranks "10" to "14" are included in the third response.

Meanwhile, the maximum number of responses P2 before an alternative answer has already been set to the response number, and thus "null" is set to the response numbers in the answer ranks "15" to "20". In the fifth and subsequent responses, an alternative answer is included in a response and is displayed on the user terminal 3.

Figure 31:
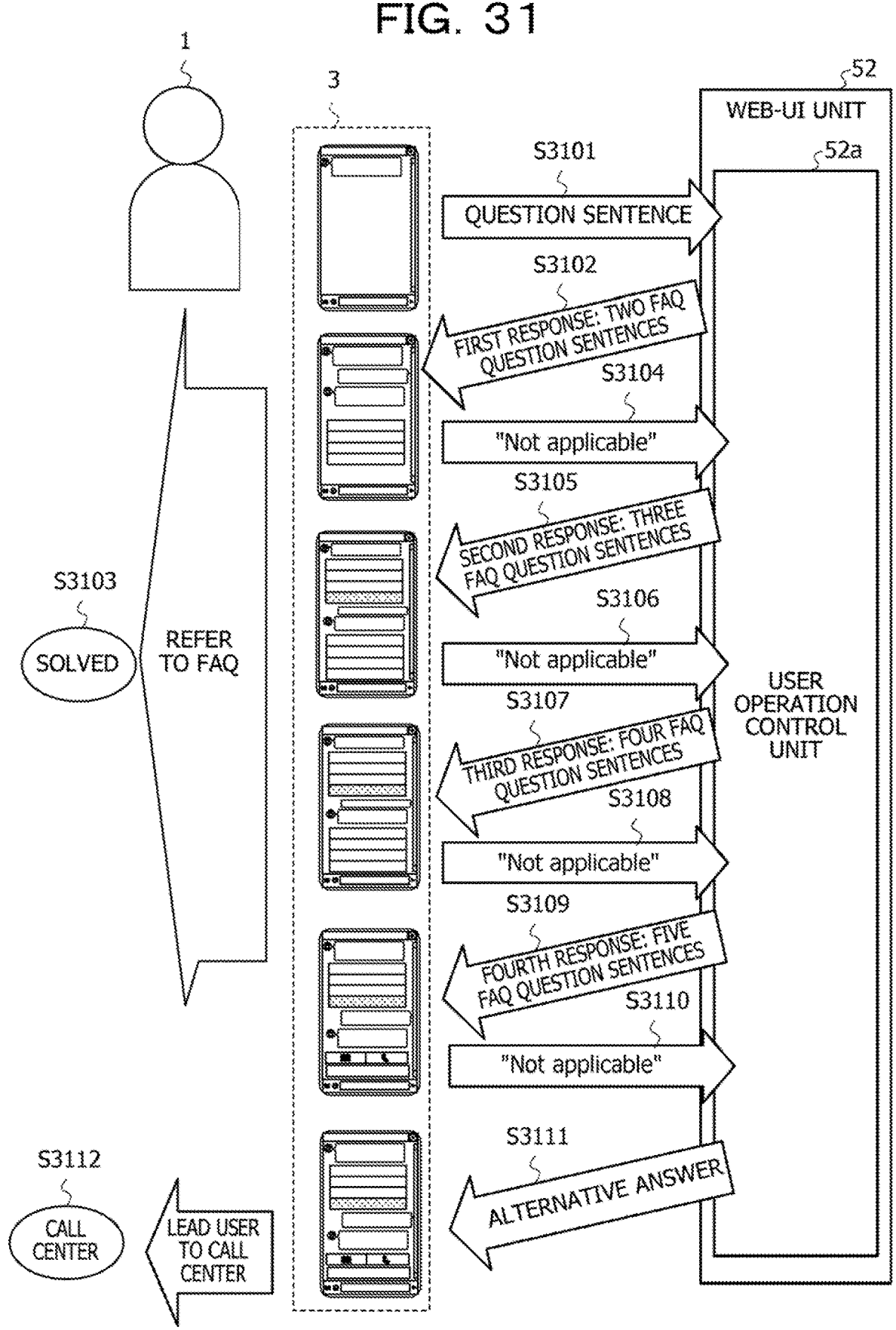
FIG. 31 illustrates an exemplary processing flow between a user terminal and a server apparatus according to Operation 3.

FIG. 31 illustrates an exemplary processing flow between the user terminal and the server apparatus according to Operation 3. As illustrated in FIG. 31, in the server apparatus 100, upon receipt of a question sentence from the user terminal 3 (step S3101), the user operation control unit 52a of the WEB-UI unit 52 acquires the FAQ response list 201 in which candidate FAQ similar to the question sentence are sorted in order of accuracy from the FAQ searching unit 44a via the WEB-API unit 53.

The user operation control unit 52a creates the table 201-3 (FIG. 30) in the storage unit 130a on the basis of the FAQ response list 201, includes the FAQ question sentences of the response number "1" in the first response, transmits the first response to the user terminal 3, and displays the first response on the user I/F 16b (step S3102).

In a case where any of answers displayed as the first response displayed on the user terminal 3 corresponds to the intended question, the user 1 selects one of the displayed FAQ question sentences, and thus an FAQ response sentence is displayed on the user terminal 3. Therefore, the question of the user 1 is solved (step S3103). Meanwhile, when the user 1 determines that the answers displayed as the displayed first response do not correspond to the intended question sentence and selects "Not applicable", a telegraphic message indicating "Not applicable" is transmitted to the server apparatus 100 (step S3104).

In the server apparatus 100, upon receipt of the telegraphic message indicating "Not applicable", the user operation control unit 52a refers to the table 201-3 to search for a record indicating the response number "2". In the table 201-3, the FAQ question sentences of the response number "2" are included in the second response, are transmitted to the user terminal 3, and are displayed on the user I/F 16b (step S3105).

In a case where any of answers displayed as the second response displayed on the user terminal 3 corresponds to the intended question, the user 1 selects one of the displayed FAQ question sentences, and thus an FAQ response sentence is displayed on the user terminal 3. Therefore, the question of the user 1 is solved (step S3103). Meanwhile, when the user 1 determines that the answers displayed as the displayed second response do not correspond to the intended question sentence and selects "Not applicable", a telegraphic message indicating "Not applicable" is transmitted to the server apparatus 100 (step S3106).

In the server apparatus 100, upon receipt of the telegraphic message indicating "Not applicable", the user operation control unit 52a refers to the table 201-3 to search for a record indicating the response number "3". In the table 201-3, the FAQ question sentences of the response number "3" are included in the third response, are transmitted to the user terminal 3, and are displayed on the user I/F 16b (step S3107).

In a case where any of answers displayed as the third response displayed on the user terminal 3 corresponds to the intended question, the user 1 selects one of the displayed FAQ question sentences, and thus an FAQ response sentence is displayed on the user terminal 3. Therefore, the question of the user 1 is solved (step S3103). Meanwhile, when the user 1 determines that the answers displayed as the displayed third response do not correspond to the intended question sentence and selects "Not applicable", a telegraphic message indicating "Not applicable" is transmitted to the server apparatus 100 (step S3108).

In the server apparatus 100, upon receipt of the telegraphic message indicating "Not applicable", the user operation control unit 52a refers to the table 201-3 to search for a record indicating the response number "4". In the table 201-3, the FAQ question sentences of the response number "4" are included in the fourth response, are transmitted to the user terminal 3, and are displayed on the user I/F 16b (step S3109).

In a case where any of answers displayed as the fourth response displayed on the user terminal 3 corresponds to the intended question, the user 1 selects one of the displayed FAQ question sentences, and thus an FAQ response sentence is displayed on the user terminal 3. Therefore, the question of the user 1 is solved (step S3103). Meanwhile, when the user 1 determines that the answers displayed as the displayed fourth response do not correspond to the intended question sentence and selects "Not applicable", a telegraphic message indicating "Not applicable" is transmitted to the server apparatus 100 (step S3110).

In the server apparatus 100, upon receipt of the telegraphic message indicating "Not applicable", the user operation control unit 52a refers to the table 201-3 to search for a record indicating the response number "5". No record indicating the response number "5" exists in the table 201-3, and thus an alternative answer for leading the user to the call center is transmitted to the user terminal 3 as a response (step S3111). When the alternative answer is displayed on the user terminal 3 (step S3112), the user 1 can obtain inquiry means to the call center.

FIG. 32 illustrates exemplary data of a table regarding the display control in Operation 4. In FIG. 32, a table 201-4 is a data table showing results of the display control in Operation 2. The table 201-4 shows exemplary data of items similar to those of the table 201-1 in FIG. 26.

Referring to the table 201-4, the accuracy in the answer rank "1" is "0.4418", which is less than the single application threshold S1. In a case where the accuracies are added according to the answer ranks from the answer rank "1" to the maximum number of times P1 per response, the accuracy "1.0057" is obtained when the accuracy in the answer rank "3" is added. The total accuracy "1.0057" is equal to or larger than the high-accuracy threshold S2, and thus the FQA question sentences in the answer ranks "1" to "3" are included in the first response. Therefore, "1" is set to the response numbers in the answer ranks "1" to "3".

Then, when the accuracies are added from the answer ranks "4" to "8" corresponding to the maximum number of times P1 per response, "0.8259" is obtained. The total accuracy "0.8259" is equal to or less than the low-accuracy threshold S3, and thus "null" is set to the response numbers in the answer ranks "4" to "8". In the second response, an alternative answer is included in a response and is displayed on the user terminal 3.

Figure 33:
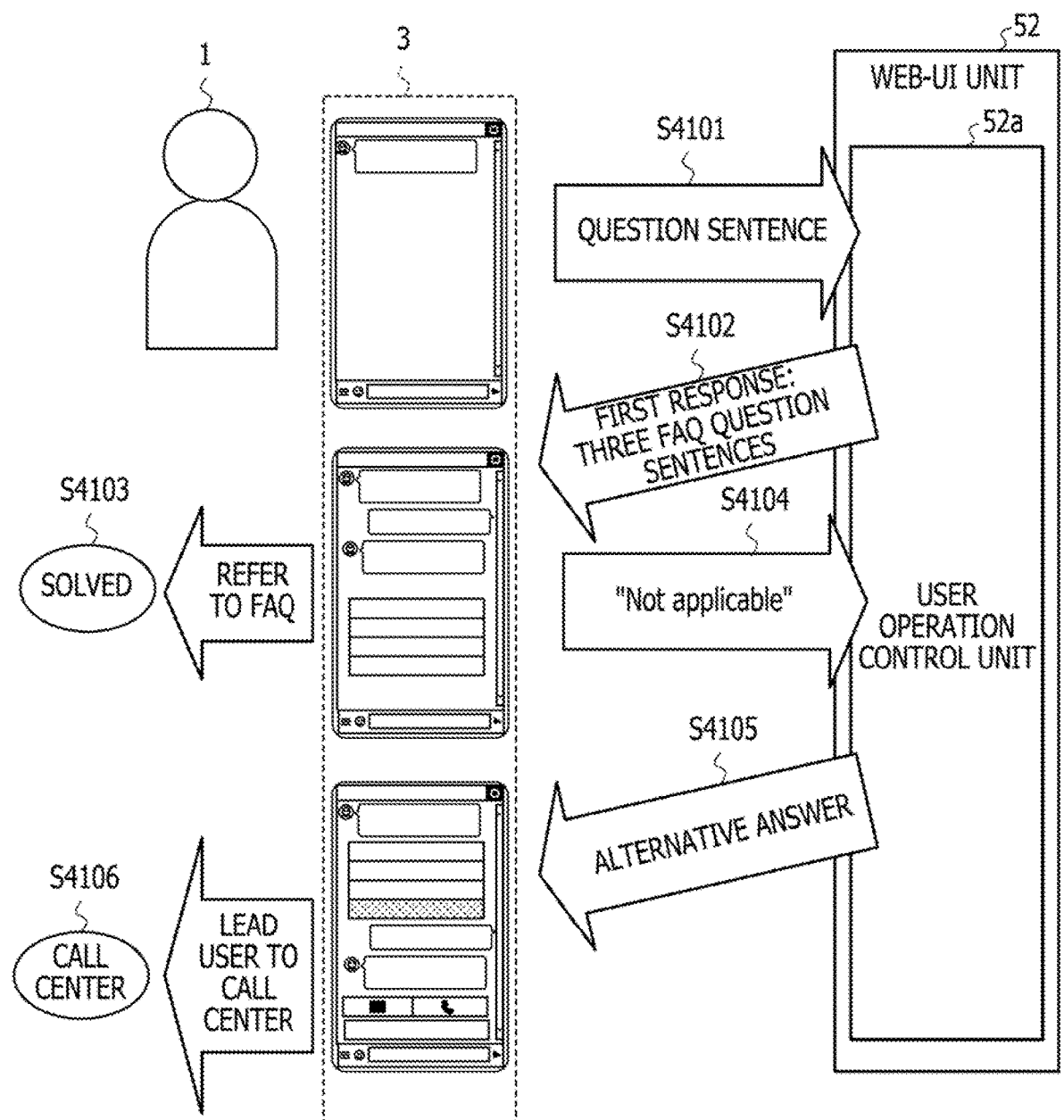
FIG. 33 illustrates an exemplary processing flow between a user terminal and a server apparatus according to Operation 4.

FIG. 33 illustrates an exemplary processing flow between the user terminal and the server apparatus according to Operation 4. As illustrated in FIG. 33, in the server apparatus 100, upon receipt of a question sentence from the user terminal 3 (step S4101), the user operation control unit 52a of the WEB-UI unit 52 acquires the FAQ response list 201 in which candidate FAQ similar to the question sentence are sorted in order of accuracy from the FAQ searching unit 44a via the WEB-API unit 53.

The user operation control unit 52a creates the table 201-4 (FIG. 32) in the storage unit 130a on the basis of the FAQ response list 201, includes the FAQ question sentences of the response number "1" in the first response, transmits the first response to the user terminal 3, and displays the first response on the user I/F 16b (step S4102).

In a case where any of answers displayed as the first response displayed on the user terminal 3 corresponds to the intended question, the user 1 selects one of the displayed FAQ question sentences, and thus an FAQ response sentence is displayed on the user terminal 3. Therefore, the question of the user 1 is solved (step S4103). Meanwhile, when the user 1 determines that the answers displayed as the displayed first response do not correspond to the intended question sentence and selects "Not applicable", a telegraphic message indicating "Not applicable" is transmitted to the server apparatus 100 (step S4104).

In the server apparatus 100, upon receipt of the telegraphic message indicating "Not applicable", the user operation control unit 52a refers to the table 201-4 to search for a record indicating the response number "2". No record indicating the response number "2" exists in the table 201-4, and thus an alternative answer for leading the user to the call center is transmitted to the user terminal 3 as a response (step S4105). When the alternative answer is displayed on the user terminal 3 (step S4106), the user 1 can obtain inquiry means to the call center.

FIG. 34 illustrates exemplary data of a table regarding the display control in Operation 5. In FIG. 34, a table 201-5 is a data table showing results of the display control in Operation 5. The table 201-5 shows exemplary data of items similar to those of the table 201-1 in FIG. 26.

Referring to the table 201-5, the accuracy in the answer rank "1" is "0.1612", which is less than the single application threshold S1. Thus, the accuracies are added according to the answer ranks from the answer rank "1" to the maximum number of times P1 per response. Even in a case where the accuracies in the answer ranks "1" to "5" are summed up, the total accuracy is "0.6366", which is less than the low-accuracy threshold S3. Thus, it is determined that it is difficult to answer the question sentence of the user 1, and an alternative answer is made.

Figure 35:
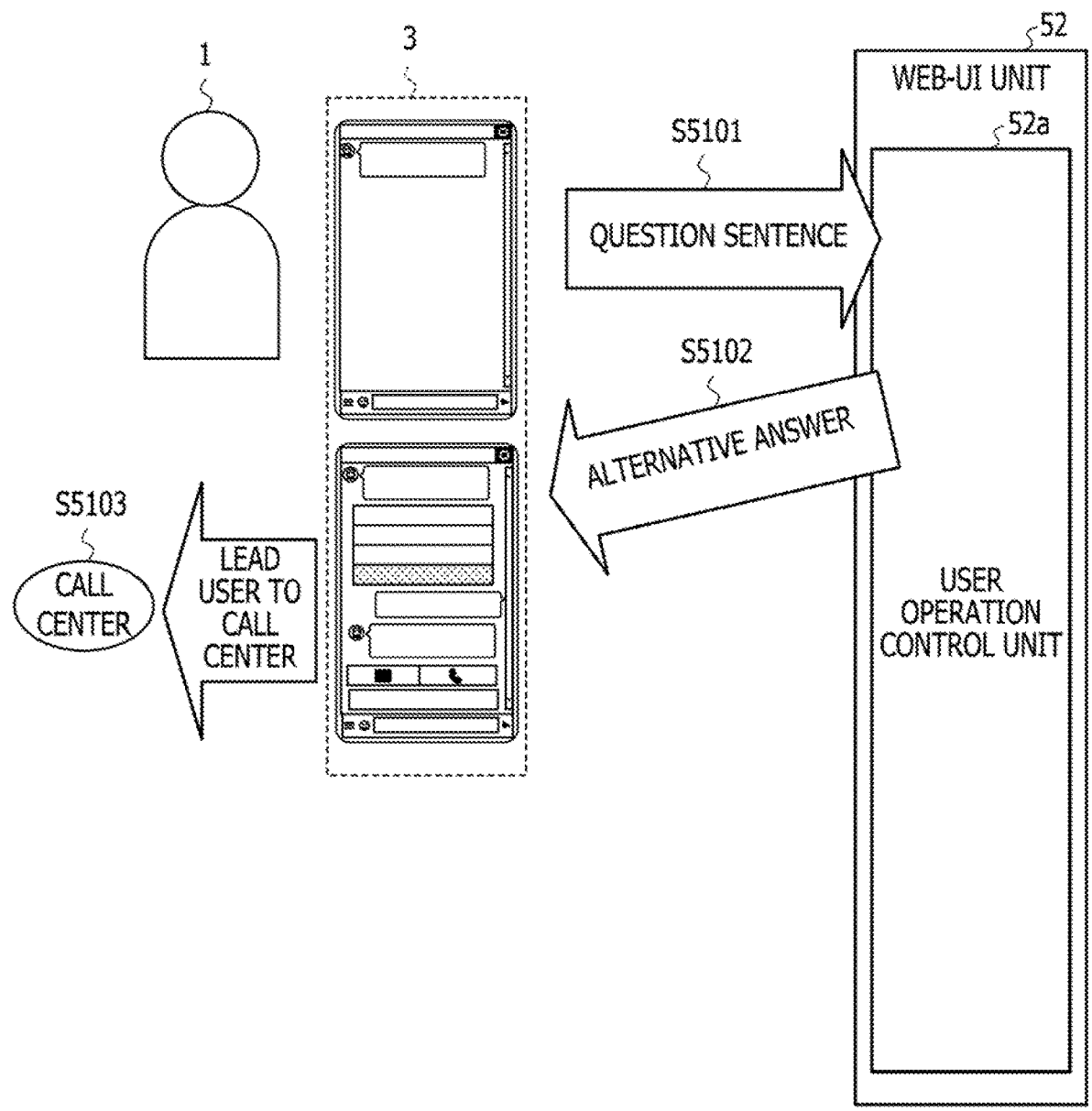
FIG. 35 illustrates an exemplary processing flow between a user terminal and a server apparatus according to Operation 5.

FIG. 35 illustrates an exemplary processing flow between the user terminal and the server apparatus according to Operation 5. As illustrated in FIG. 35, in the server apparatus 100, upon receipt of a question sentence from the user terminal 3 (step S5101), the user operation control unit 52a of the WEB-UI unit 52 acquires the FAQ response list 201 in which candidate FAQ similar to the question sentence are sorted in order of accuracy from the FAQ searching unit 44a via the WEB-API unit 53.

The user operation control unit 52a creates the table 201-5 (FIG. 34) in the storage unit 130a on the basis of the FAQ response list 201, determines that it is difficult to answer the question sentence of the user 1 because no FAQ question sentence of the response number "1" exists in the table 201-5, and transmits an alternative answer to the user terminal 3 as a response (step S5102).

When the alternative answer is displayed on the user terminal 3 (step S5103), the user 1 can obtain inquiry means to the call center.

As described above, according to this embodiment, the number of answers to be displayed for each response on the user terminal 3 is determined in accordance with accuracy of answers and a degree of fulfillment of answers of an FAQ search engine. Further, in a case where no answer can be obtained with a certain or higher degree of accuracy, a message such as "Connect to the call center" is displayed to lead the user 1 to the call center.

The user 1 who uses a UI of the chatbot can obtain a plurality of selectable answers in a response with respect to a single question, and can therefore obtain desired information with fewer operations.

This embodiment is also applicable to, for example, a safety confirmation system that gives answers regarding safety confirmation in response to safety confirmation inquiries from school students and staffs, employees in an office, and the like when an earthquake or weather warning occurs.

In the above description, the FAQ search evaluation unit 44 corresponds to an example of an extraction unit, and the WEB service unit 51 corresponds to an example of a selection unit.

The present invention is not limited to the embodiments specifically disclosed above, and various modifications and changes can be made without departing from the scope of the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium recording an output control program for causing a computer to execute processing of:

in a case where input of a question from a user is accepted, extracting a list in which a plurality of answers to the question and an accuracy indicating likelihood as an answer to the question are associated with each other, the list being stored in a storage circuit;

selecting a first answer having the largest accuracy from among the plurality of answers;

outputting the first answer when the largest accuracy of the first answer is equal to or larger than a first threshold;

selecting a plurality of second answers from among the plurality of answers when the largest accuracy of the first answer is smaller than the first threshold or when the user requests another answer other than the first answer;

outputting the plurality of second answers when a total value of the accuracy of the plurality of second answers is equal to or larger than a second threshold and a number of the plurality of second answers is equal to or smaller than a maximum number of answers;

outputting a specific answer which leads the user to an call center instead of the plurality of second answers when not selecting the plurality of second answers in which the total value of the accuracy of the plurality of second answers is equal to or larger than the second threshold and the number of the plurality of second answers is equal to or smaller than the maximum number of answers;

selecting the plurality of second answers from among the plurality of answers in descending order of the accuracy of the one or plurality of answers; and changing contents to be output to the specific answer in a case where a total value of accuracies of answers extracted from the plurality of answers in the descending order of the accuracy until a number of the answers reaches the maximum number of answers is equal to or less than a third threshold.

2. The non-transitory computer-readable recording medium according to claim 1 for causing the computer to further execute processing of setting each time when the total value becomes equal to or larger than the second threshold as an output unit in descending order of the accuracy, performing first output including the first answer in response to the question, and performing second output in response to input to the first output.

3. The non-transitory computer-readable recording medium according to claim 2 for causing the computer to further execute processing of in a case where the accuracy is equal to or less than the third threshold, adding a specific message to the beginning of each of the plurality of answers.

4. The non-transitory computer-readable recording medium according to claim 3, wherein a value decreases in the order of the second threshold, the third threshold, and the first threshold.

5. An output control method, comprising causing a computer to execute processing of:

in a case where input of a question from a user is accepted, extracting a list in which a plurality of answers to the question and an accuracy indicating likelihood as an answer to the question are associated with each other, the list accuracy being stored in a storage circuit, selecting a first answer having the largest accuracy from among the plurality of answers;

outputting the first answer when the largest accuracy of the first answer is equal to or larger than a first threshold;

selecting a plurality of second answers from among the plurality of answers when the largest accuracy of the first answer is smaller than the first threshold or when the user requests another answer other than the first answer;

outputting the plurality of second answers when a total value of the accuracy of the plurality of second answers is equal to or larger than a second threshold and a number of the plurality of second answers is equal to or smaller than a maximum number of answers;

outputting a specific answer which leads the user to an call center instead of the plurality of second answers when not selecting the plurality of second answers in which the total value of the accuracy of the plurality of second answers is equal to or larger than the second threshold and the number of the plurality of second answers is equal to or smaller than the maximum number of answers;

selecting the plurality of second answers from among the plurality of answers in descending order of the accuracy of the one or plurality of answers; and changing contents to be output to the specific answer in a case where a total value of accuracies of answers extracted from the plurality of answers in the descending order of the accuracy until a number of the answers reaches the maximum number of answers is equal to or less than a third threshold.

6. An information processing apparatus comprising:

a memory; and a processor coupled to the memory and configured to:

in a case where input of a question from a user is accepted, extract a list in which a plurality of answers to the question and an accuracy indicating likelihood as an answer to the question are associated with each other, the list being stored in the memory;

select a first answer having the largest accuracy from among the plurality of answers;

output the first answer when the largest accuracy of the first answer is equal to or larger than a first threshold;

select a plurality of second answers from among the plurality of answers when the largest accuracy of the first answer is smaller than the first threshold or when the user requests another answer other than the first answer;

output the plurality of second answers when a total value of the accuracy of the plurality of second answers is equal to or larger than a second threshold and a number of the plurality of second answers is equal to or smaller than a maximum number of answers;

output a specific answer which leads the user to an call center instead of the plurality of second answers when not selecting the plurality of second answers in which the total value of the accuracy of the plurality of second answers is equal to or larger than the second threshold and the number of the plurality of second answers is equal to or smaller than the maximum number of answers;

select the plurality of second answers from among the plurality of answers in descending order of the accuracy of the one or plurality of answers; and change contents to be output to the specific answer in a case where a total value of accuracies of answers extracted from the plurality of answers in the descending order of the accuracy until a number of the answers reaches the maximum number of answers is equal to or less than a third threshold.

* * * * *